(12) United States Patent
LaCroix

(10) Patent No.: US 9,441,749 B1
(45) Date of Patent: Sep. 13, 2016

(54) VACUUM RELIEF VALVE

(71) Applicant: Kelso Technologies, Inc., Delta (CA)

(72) Inventor: Barry LaCroix, Corunna, CA (US)

(*) Notice: Subject to any disclaimer, the term of this patent is extended or adjusted under 35 U.S.C. 154(b) by 39 days.

(21) Appl. No.: 14/510,022

(22) Filed: Oct. 8, 2014

Related U.S. Application Data

(63) Continuation-in-part of application No. 13/999,997, filed on Apr. 12, 2014, which is a continuation-in-part of application No. 13/999,046, filed on Jan. 7, 2014, now abandoned, which is a continuation-in-part of application No. 13/998,078, filed on Sep. 28, 2013.

(51) Int. Cl.
*F16K 17/04* (2006.01)
*F16K 17/196* (2006.01)

(52) U.S. Cl.
CPC ............ *F16K 17/04* (2013.01); *F16K 17/044* (2013.01); *F16K 17/0493* (2013.01); *F16K 17/196* (2013.01); *Y10T 137/7897* (2015.04); *Y10T 137/7923* (2015.04)

(58) Field of Classification Search
CPC .. F16K 17/04; F16K 17/0426; F16K 17/044; F16K 17/0473; F16K 17/0493; F16K 17/19; F16K 17/196; F16K 17/36; Y10T 137/7922; Y10T 137/7923; Y10T 137/7925; Y10T 137/7897
See application file for complete search history.

(56) References Cited

U.S. PATENT DOCUMENTS

| | | | | |
|---|---|---|---|---|
| 3,974,850 A | * | 8/1976 | Pierson | 137/493.9 |
| 4,273,153 A | * | 6/1981 | Brown | 137/454.5 |
| 4,941,503 A | | 7/1990 | Hubner, Jr. | |
| 5,031,790 A | * | 7/1991 | Keller | 220/203.2 |
| 5,060,688 A | * | 10/1991 | Sorensen | 137/471 |
| 5,111,837 A | * | 5/1992 | Morris et al. | 137/72 |
| 5,125,430 A | * | 6/1992 | Petersen et al. | 137/514 |
| 5,325,882 A | * | 7/1994 | Forsythe et al. | 137/73 |
| 5,479,978 A | | 1/1996 | Zenkich | |
| 5,855,225 A | * | 1/1999 | Williams, III | 137/535 |
| 6,422,530 B1 | * | 7/2002 | Williams, III | 251/27 |
| 8,453,668 B2 | | 6/2013 | Michelli et al. | |
| 2011/0073199 A1 | * | 3/2011 | Stocker, Jr. | F16K 15/063 137/526 |
| 2012/0216885 A1 | * | 8/2012 | Williams, III | 137/535 |

OTHER PUBLICATIONS

Vacuum Relief Valves (c) 2002 Midland Manufacturing Corp. Specification Sheet, Doc. No. A-220-W-NS and A-222-W-NS, Oct. 2, 2005.
Vacuum Relief Valves, Operation and Maintenance, Doc. No. A-205/A-222 rev. 1.2, Midland Manufacturing Corp. Jun. 2005.
Midland Model A-21-FR1 Vacuum Relief Valve Specification Sheet, Mar. 11, 2013(Rev. 1).
Vacuum Relief Valve Photo and Diagram Sheet, (c) 2009 American Railcar Industries, Inc.
Salco Products, Inc., Tank Car Vacuum Relief Valves Description Sheet, Rev.:01.11.

* cited by examiner

*Primary Examiner* — Craig Schneider
*Assistant Examiner* — Frederick D Soski
(74) *Attorney, Agent, or Firm* — Adrienne B. Naumann

(57) ABSTRACT

The invention described herein is a vacuum relief valve for rail way tanks, truck tanks, or any other analogous closed containers in which a valve prevents implosions from an interior vacuum pressure. The valve contains a novel biasing assembly and spring housing with constant force springs and this assembly is operatively attached to the tank. The pressure from these springs is such that only when the interior tank vacuum becomes greater than the springs' preset value will air enter the valve and the operatively attached tank. No increasing pressure from the biasing assembly is necessary to maintain the air flow into the valve at the air flow's initial rate.

5 Claims, 17 Drawing Sheets

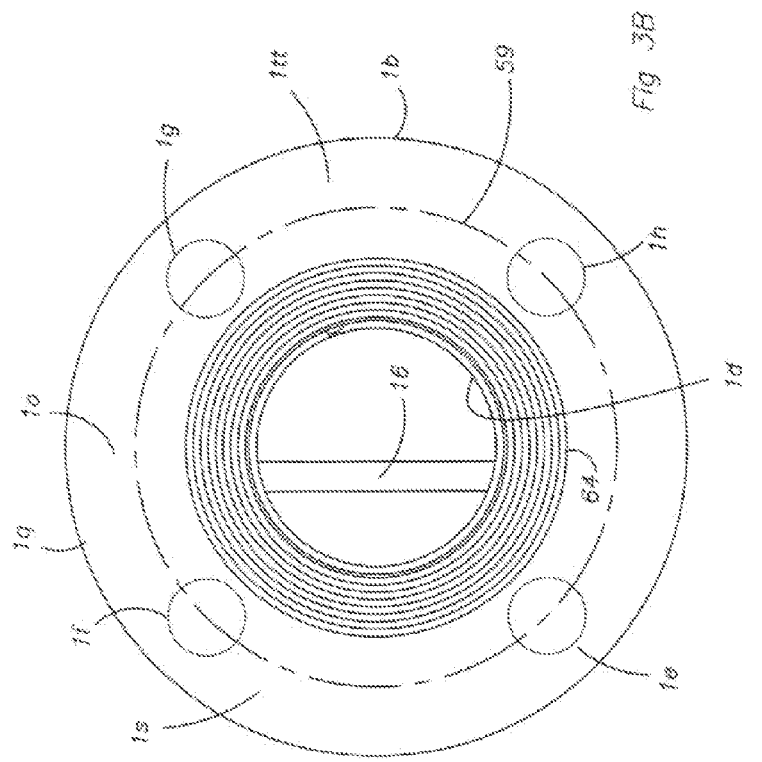
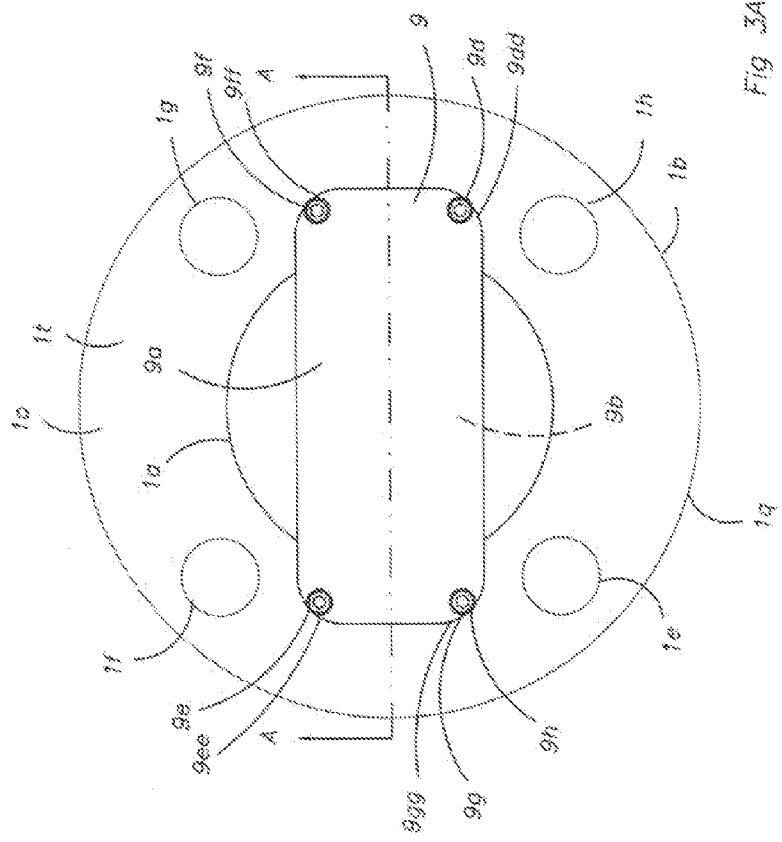

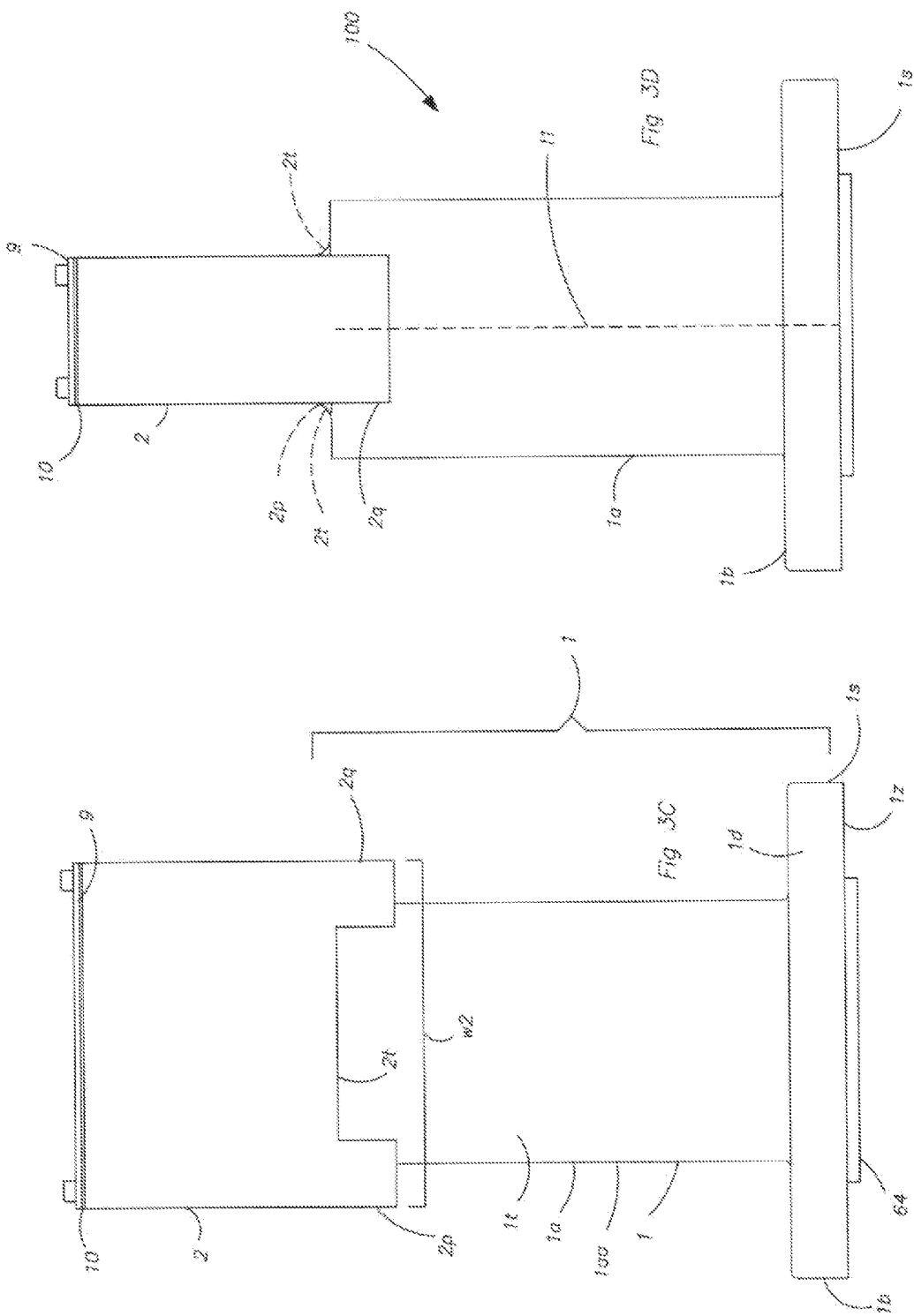

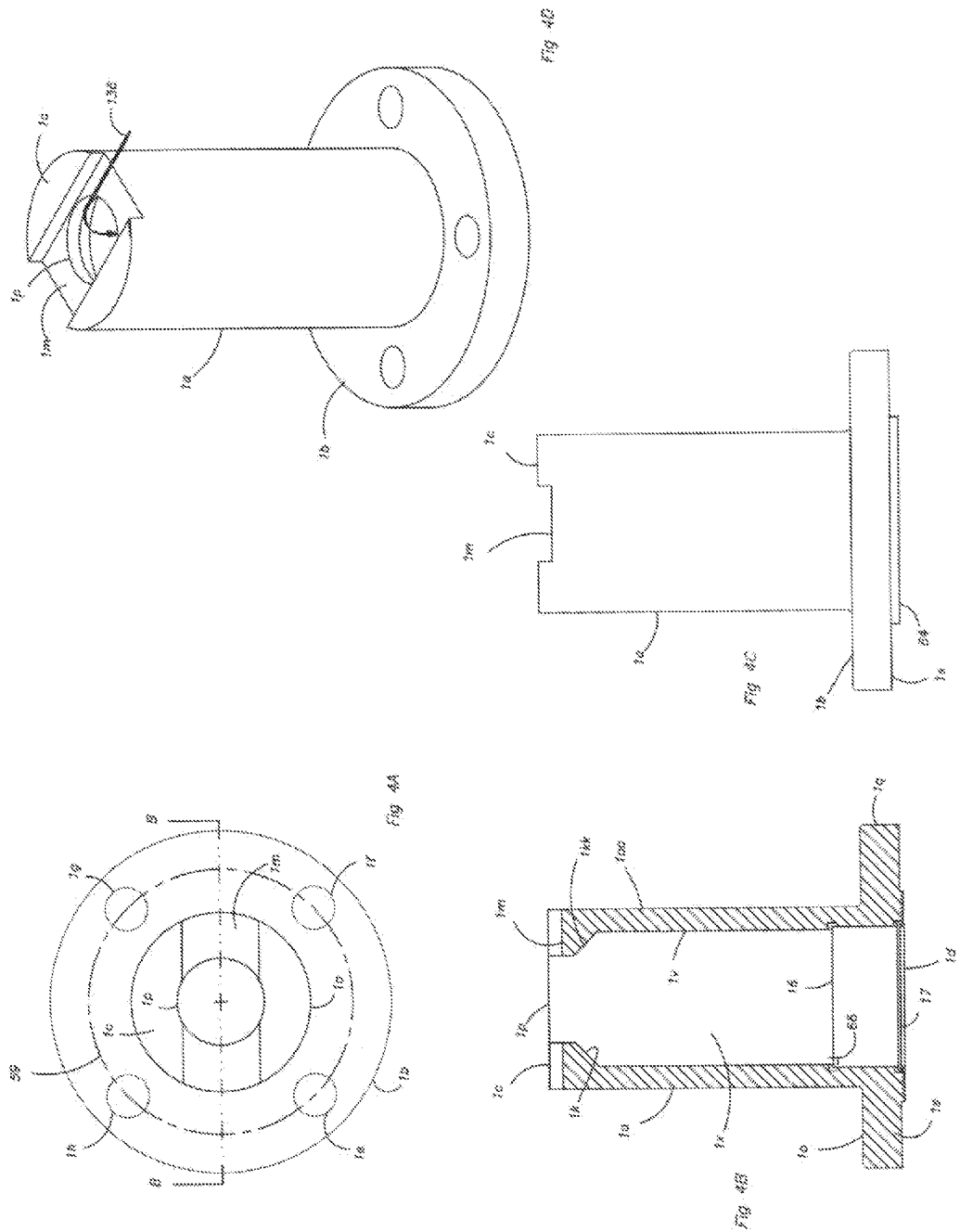

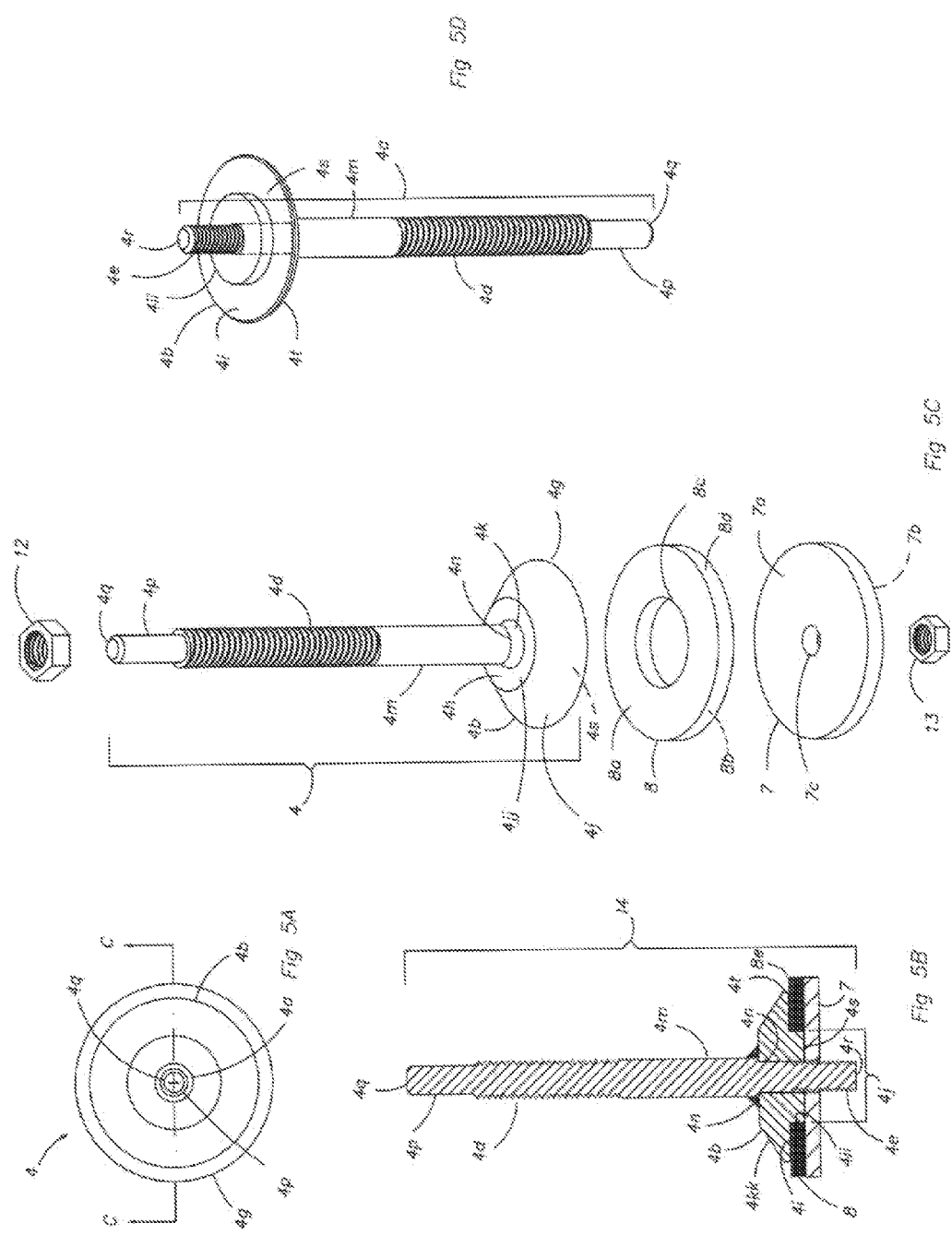

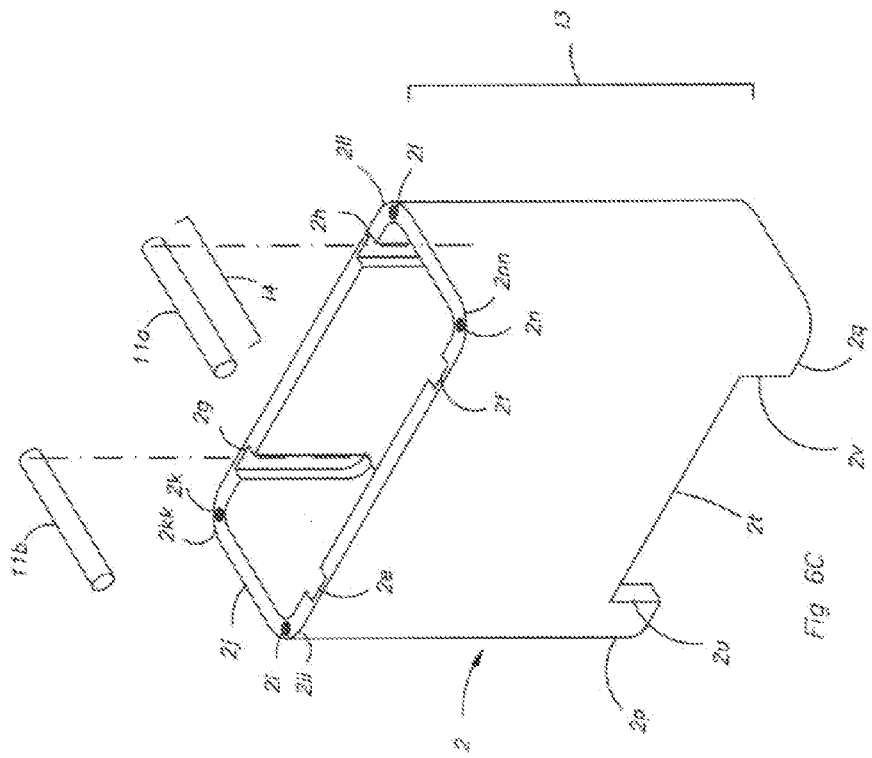
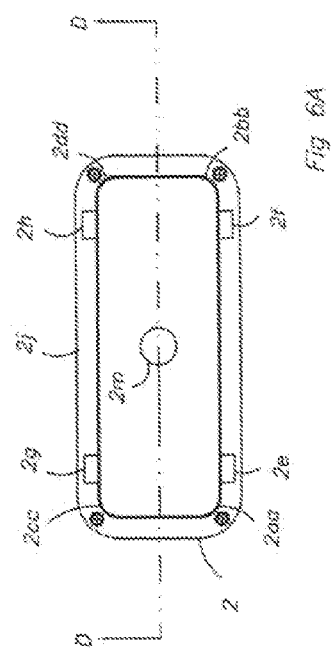
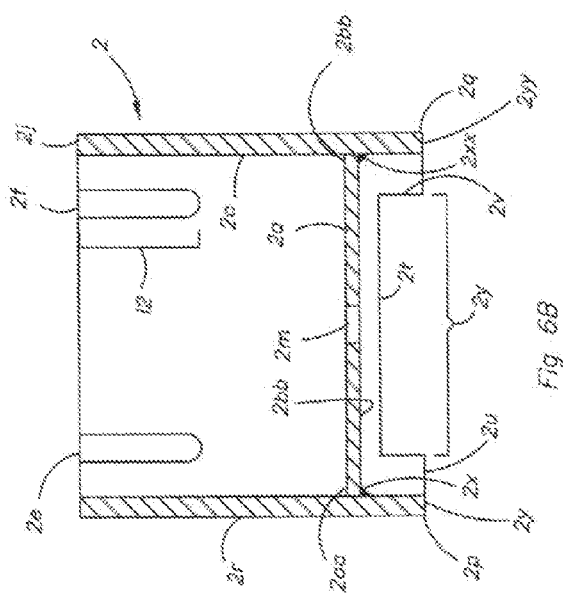

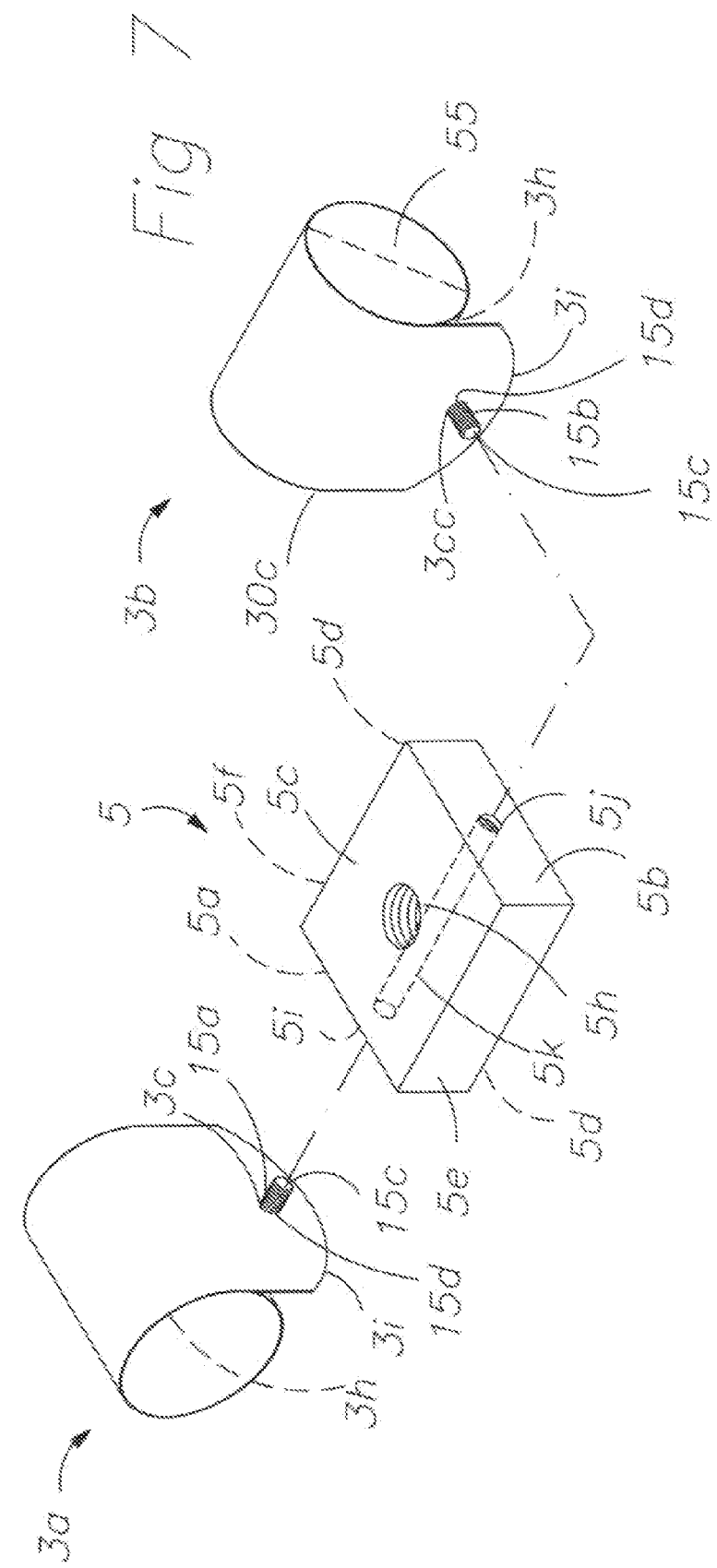

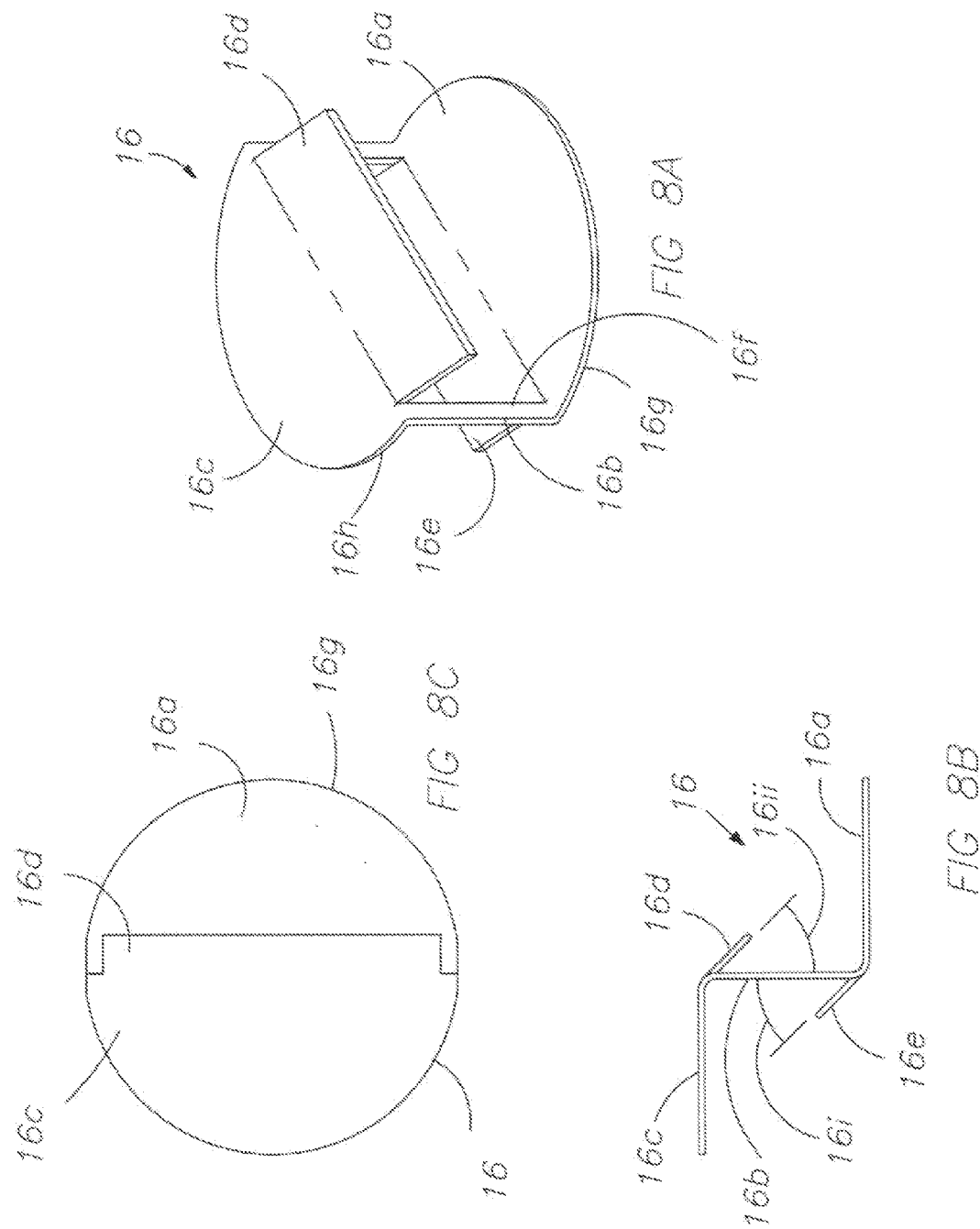

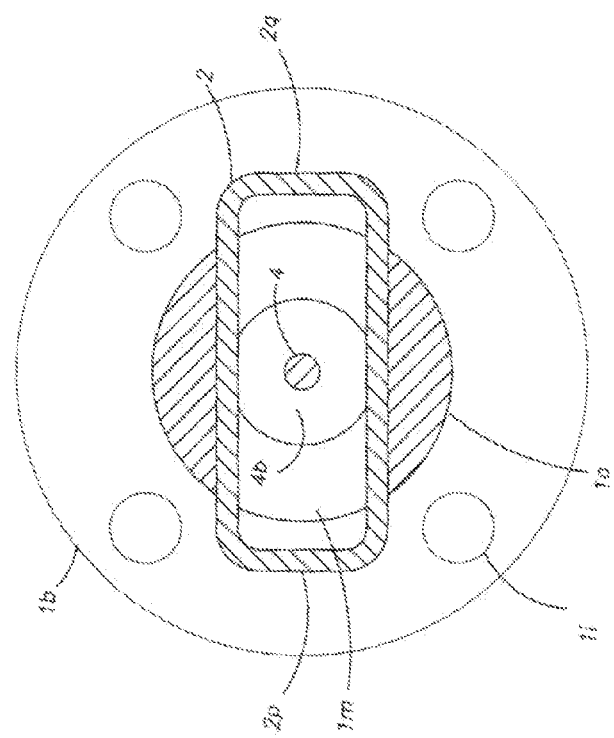
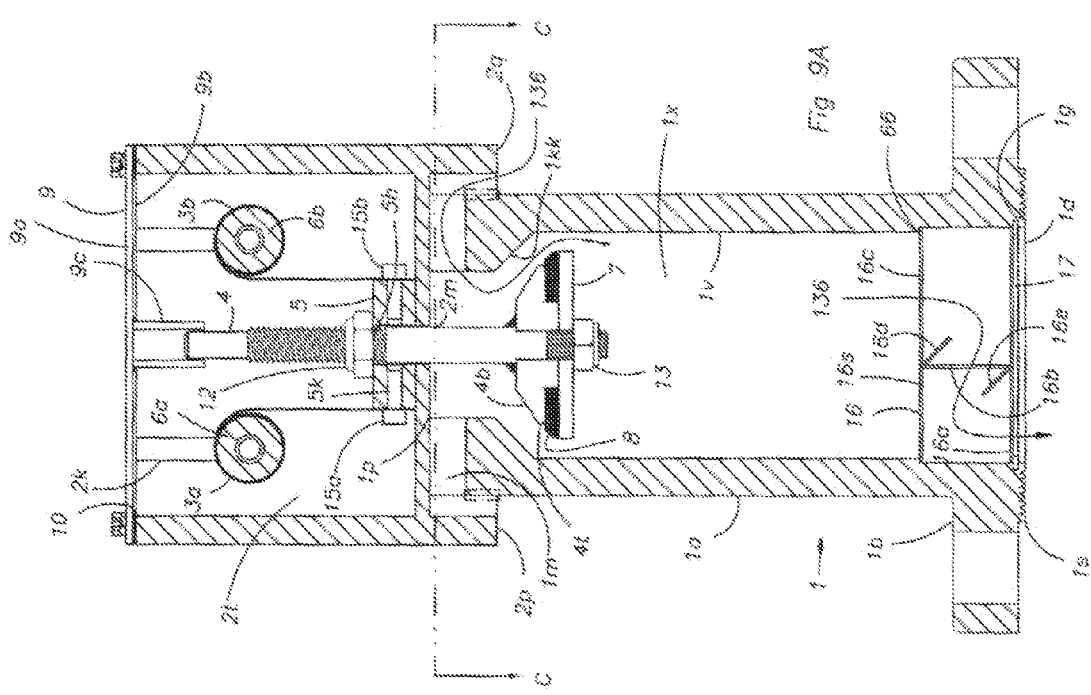
Fig. 9B
Fig. 9A

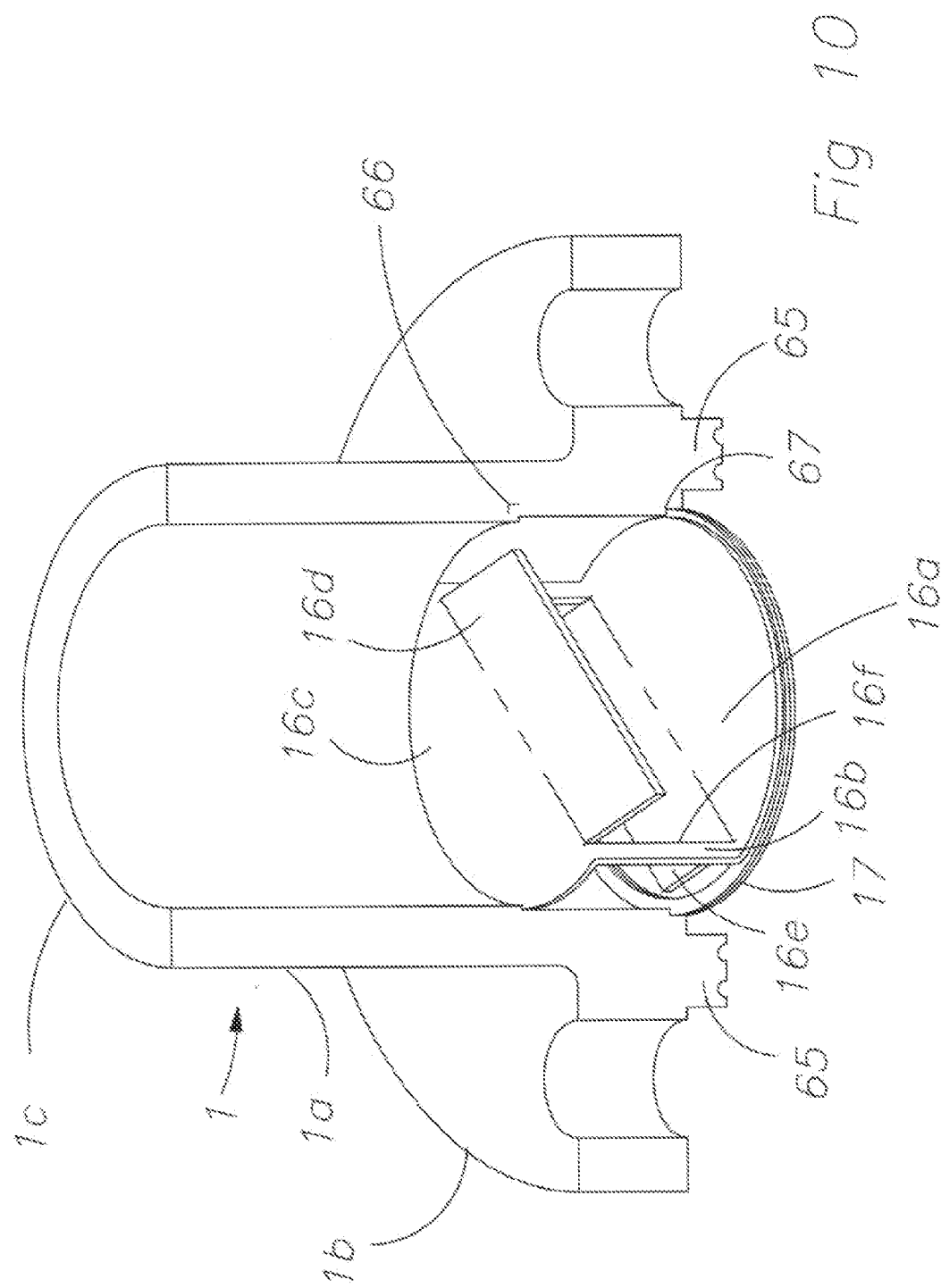

VACUUM RELIEF VALVE

This application is a continuation in part of U.S. patent application Ser. No. 13/999,997 filed Apr. 12, 2014 which is a continuation in part of U.S. patent application Ser. No. 13/999,046 filed Jan. 7, 2014 now abandoned, and which was a continuation in part of U.S. patent application Ser. No. 13/998,078 filed Sep. 28, 2013.

BACKGROUND

The present invention relates generally to a vacuum relief valve that prevents a rail tank car or truck tank from collapsing when the car or tank (i) contains fluid or gases that (ii) swiftly shrink when suddenly exposed to higher and thereafter colder temperatures or (iii) whenever a tank car or truck is unloaded with a suction pump. More particularly this invention relates to a vacuum relief valve that intakes atmospheric air whenever closed tanks (i) containing contracting fluids or gases within a closed container (ii) create a vacuum that is greater than a predetermined magnitude. Most particularly the present invention relates to a biasing assembly that (i) maintains a maximum flow of the atmospheric air into a vacuum relief valve and operatively attached closed container (ii) even if the closed container vacuum doe not increase in magnitude.

Rail way tank cars and trucks that transport fluids generally comprise:

(1) low pressure (general purpose) tanks; and
(2) pressure tanks.

The present invention exclusively addresses low pressure tanks which may require vacuum relief valves. The primary purpose of the vacuum relief valve is to allow air into the tank or truck and thereby (i) prevent or delay tank failure by implosion resulting from (ii) rapidly decreasing internal pressure. The current invention is not intended for normal loading and unloading processes, and is used exclusively under non-standard conditions.

Certain liquids and gases transported in railway tank cars or tank trucks, such as but not exclusively crude oil, toluene and styrene, are especially hazardous at elevated temperature as commodities in closed containers. During transit these gases and liquids may rapidly cool, in large part due to changing temperatures within and exterior to the tank. During this cooling process the gases and liquids, otherwise known as commodity, rapidly contract within the tank or other closed container. This contraction decreases the internal pressure within the closed container or tank to a dangerous level at which the tank may implode. Furthermore, some tank cars and tanks are unloaded with a suction pump. If proper venting of the tank is not provided, the internal pressure within the closed tank will decrease to a dangerous level at which the closed tank may implode.

Prior art vacuum relief valves do not implement constant force springs as their biasing elements. FIG. 11 graphically displays the force deflection relationships for both helical springs and constant force springs as a function of load. The relationship for the helical spring behavior to an opposing vacuum is linear. As a result there is a consistent constant deflection increment that corresponds to a consistent constant increase in vacuum. In contrast, for the constant force spring the relationship between spring deflection and vacuum is non-linear and spring deflection remains constant after a specific vacuum magnitude.

As seen in FIG. 11, the lines for the helical spring and constant force spring intersect at four inches of Hg, 0.8 inch deflection; this is the set pressure for a non-specific vacuum relief valve. At this point the vacuum relief valve begins to discharge atmospheric air into the tank. When the vacuum within the tank or other closed container just exceeds four inches Hg, the constant force spring (i) deflects to a fully open position (ii) whenever valve flow area is maximized. In contrast, a helical compression spring does not achieve the full open position until the vacuum achieves six inches Hg.

As best seen in FIG. 12, existing vacuum relief valves are generally biased to a closed pre-intake position with a single helical coil spring of the behavior displayed in FIG. 11. In this biased configuration, valve openings to the atmosphere are physically closed by mechanical barriers, such as a biased sealing component. The problem arises whenever helical coil spring valves require that a tank's internal pressure continue to decrease beyond the initial valve opening pressure for maximum valve venting capacity. As seen in FIG. 11, a progressively greater tank vacuum is necessary to fully deflect the helical spring valve beyond the initial discharge pressure. For example, Elmac Technologies displays a vacuum valve without a structure analogous to constant force springs. Http://www.elmactechnologies.com/products/pvrv-387.htm.

Other valves display features also do not solve this problem. For example, Midland Manufacturing's valve was intended to prevent damage to tank cars during routine tank loading and unloading. Http://www.midlandmfg.com/products/general-purpose-car/vacuum-relief-valve. McKenzie Valve & Machining LLC discloses a vacuum relief valve with a weather cover designed to eliminate the accidental actuation of the valve. However, the prototype comprises a single coiled helical spring as the biasing component for the valve. Http://www.mckenzievalve.com/mvpages/VRV.htm.

The current invention solves this problem with a novel biasing assembly that results in (i) a constant flow rate of air into a closed container (ii) despite a decrease in opposing tank pressure from the decreasing vacuum. This biasing assembly allows air into the valve and thereafter into the container as long as the assembly's preset pressure is less than that of the tank. This biasing assembly preferably contains two constant force springs attached to a solid weight designated as a spring block. When attached to opposing lateral sides of a spring block, these constant force springs maintain a constant maximum venting capacity at just above a preset and pre-calibrated opening pressure of the valve.

With constant force springs the valve opens fully near the initial preset discharge pressure. This valve provides a greater rate of air flow because after the initial preset discharge pressure the atmospheric air maximally flows into the tank without an increase in the magnitude of the tank vacuum. The vacuum relief valve described herein also serves as an emergency device when other conventional air valves do not open during routine tank unloading operations.

In addition to the above problem, many currently existing vacuum relief valves implement a single O-ring at a lowermost sealing disc to prevent leakage between a sealing component and the valve cavity interior wall. This sealing disc is positioned immediately below cylindrical channels. Please see FIG. 12. However, the single O-ring is easily dislodged from lowermost sealing disc whenever a tank contains a highly viscous fluid. This event occurs because one segment of the O-ring may bond to the valve body interior wall surface, while another segment sticks within the circular groove within valve sealing disc. Furthermore, conventional vacuum relief valves are vulnerable to leakage because of debris that frequently lodges between the valve seal and spring housing described infra. When this debris accumulation occurs, the prior art valves leak and this leakage may result in a non-accident release of commodity.

The vacuum relief valve described herein solves these problems by implementing either a cut flat gasket or a formed flat gasket. This circular gasket prevents this dislodgement by providing a wider area for retention. Some previous vacuum relief valves exclusively implement a formed flat gasket, but the present invention is preferably a single cut flat gasket which is less expensive. In addition, a flat cut gasket is more easily obtained and less proprietary, while a flat molded gasket is less available and more proprietary. The flat cut gasket is also more readily available in emergency situations, because gasket supply companies can produce cut gaskets immediately. In contrast, a formed gasket requires days to prepare if they are not in inventory.

The single flat cut gasket/valve seal in the current invention is not dislodged because it is compressed between (i) the valve stem sealing disc lower surface and (ii) the upper surface of a seal retainer. The stepped lower surface of the valve stem sealing disc is also a new feature that further prevents the valve seal from dislodgement. This new valve seal is further compressed and prevented from dislodging by its position between the sealing disc and the circular seal retainer. Also in the disclosed invention, the valve stem is welded to the valve stem sealing disc and this weld eliminates a secondary leakage path.

In addition to the problems described supra, vacuum relief valves are inevitably exposed to the commodity within a tank or other closed container. As a result, the springs, valve stem and elastomeric seals are fouled by tank contents that prevent or impede valve operation. To solve this problem, the current invention includes a modified baffle that reduces the area through which fluid may enter the valve interior cavity. Furthermore, previous baffles required two retaining rings to secure the baffle to the valve body cavity interior wall surface. In contrast, the present invention has a machined edge along the interior surface of the valve body cavity. This machined edge retains the upper portion of the modified baffle against the valve body cavity interior surface. This machined edge also eliminates the requirement of a second retaining ring.

The reduction in splashing commodity upon the valve seal and valve body cavity conical interior surface is achieved by the baffle, the valve seal and valve stem sealing disc. This reduction is a new feature of the current invention, as is (i) the distance of the valve seal and valve stem sealing disc lower surface from the baffle uppermost surface (ii) whenever the baffle is properly positioned within the valve body interior cavity.

SUMMARY OF THE INVENTION

The preferred embodiment of the improved pressure vacuum relief valve in the current invention includes a valve body with a lower valve circular flange, a valve stem, spring housing, constant force springs, a spring block and valve cover. In particular, the constant force springs are operatively attached to a spring block to form a biasing assembly that operatively cooperates with the vertically oriented valve stem. The pressure upon the valve stem from this biasing assembly may vertically lower or raise the valve stem within the valve body. The valve stem also moves vertically in a direction perpendicular to the valve circular flange upper surface. As the valve stem vertically lowers, it no longer mechanically seals an opening within the upper valve body, and thereby atmospheric air can enter the valve through this opening.

The valve body preferably has (i) a single valve body interior cavity with (ii) a single one valve body bottommost opening at the valve body bottommost end and (iii) a single second valve body uppermost opening. These valve body openings are continuous with the valve body interior cavity. The single valve body uppermost opening is continuous with the spring housing interior whenever spring housing is properly attached to the valve body. Valve body bottommost opening, located within the lower valve circular flange, is continuous with an opening in a tank surface whenever vacuum relief valve is properly attached to the tank or other closed container.

The valve body preferably has a single upper portion designated as a valve body upper longitudinal tube, and this valve body upper longitudinal tube contains the valve body uppermost bore. This valve body upper longitudinal tube preferably contains (i) a single valve rectangular groove at valve body tube uppermost end (ii) that surrounds the uppermost opening of the centrically positioned valve body tube bore. The valve rectangular groove provides a pathway for atmospheric air to enter valve body interior cavity through valve body tube straight bore, and thereafter the tank or other closed container. Valve body tube straight bore is rigid, straight and circular in perpendicular cross-section. Valve body tube straight bore increases in diameter from the upper edge of the valve body upper longitudinal tube to form an abutment for a lower valve sealing disc along the valve body interior cavity wall surface.

The valve body lowermost opening is preferably (i) concentrically positioned within the circular lower valve flange and (ii) surrounded by a circular valve lower flange. The circular valve lower flange contains bolt apertures for insertion of attaching bolts to a tank or other closed container. The upper and lower surfaces of the valve body lower flange are preferably
perpendicular to the valve cavity tube longitudinal length. The valve body lowermost opening is also continuous with valve body interior cavity. Valve body lowermost opening is preferably circular, concentrically aligns with, and provides a continuous conduit to an opening into a tank or other closed container from the valve body interior cavity.

The rigid valve stem of the present invention extends (i) vertically downward and perpendicular to valve body lower flange upper surface and (ii) through the spring housing that attaches to the valve body longitudinal tube uppermost end. Preferably the single valve stem is rigid, straight, cylindrical and smooth in configuration with pre-selected threaded machined exterior segments. The valve stem extends from the spring housing interior space into (i) valve body upper longitudinal tube bore and (ii) vertically downward into the valve body interior cavity.

The valve stem preferably comprises a valve stem shaft with a single valve stem sealing disc at the valve stem lowermost end. The valve stem sealing disc also includes a concentrically positioned circular sealing disk aperture for insertion of the valve stem shaft. The valve stem sealing disc preferably attaches to the lowermost end of the valve shaft with a continuous weld. The valve stem shaft preferably includes two threaded sections, while the valve stem sealing disc preferably has an (i) annular sealing disk upper surface and (ii) stepped lower sealing disk surface.

Adjacent to and positioned immediately below the coaxially aligned valve stem sealing disc, as well as enclosing the valve stem is preferably a single circular valve seal. The circular valve seal is preferably (i) a circular gasket made of an elastomeric material (ii) through which the valve stem shaft inserts. This circular valve seal provides a leak tight barrier between (i) the valve body interior cavity wall surface and (ii) valve stem lower sealing disc. Immediately below, concentrically aligned with, enclosing the valve stem, and contacting the circular valve seal is a valve seal retainer. Valve seal retainer is preferably (i) coaxially aligned with valve stem and vale seal, and (ii) consists of a circular metal plate with a concentrically positioned aperture through which the valve stem shaft protrudes. This valve seal retainer compresses the circular valve seal continuously against the valve stem sealing disc lowermost surface.

An adjustment nut inserts, and is threaded upon, the upper threaded valve stem end. This threaded adjustment nut is tightened and abuts a single spring block, infra for rotational adjustment of the valve stem to a pre-determined valve setting of preferably 4.0-4.5 psi. A seal retainer nut threads upon the lower threaded valve stem end to mechanically compress and maintain the valve seal retainer and the adjacent circular valve seal against the valve stem sealing disc lowermost surface. The valve body cavity also contains a modified baffle along the valve body cavity interior bottommost surface. This modified baffle preferably includes two semicircular steps, and this baffle prevents excess gas or liquid within the closed tank from entering the valve body cavity. A single retaining ring retains the baffle within the valve body in the proper position, and this ring fits snugly into a single machined circular groove within the valve body cavity interior bottom surface.

A spring housing preferably houses a spring block, two constant force springs and associated components that comprise the valve biasing assembly. Preferably the spring housing attaches to the valve body uppermost edge and valve body exterior surface with a weld. The spring housing interior space is continuous with the valve body interior cavity. The spring housing preferably comprises a rigid three-dimensional structure that is open at its bottommost and uppermost ends. Spring housing is preferably (i) rectangular in cross-section (ii) with two opposing continuous curved lower protruding legs. These opposing continuous curved lower protruding legs and a valve body rectangular groove create a pathway through which atmosphere air may enter the valve body.

Spring housing preferably includes a lower inset plate proximal to and above the spring housing curved lower protruding legs and spring housing lower edges. This inset plate contains an inset plate circular aperture for insertion of the valve stem. A single insert plate circular aperture is preferably positioned in the middle of the insert plate. The tight fit between the rigid smooth inset plate aperture wall and rigid hard smooth valve stem exterior surface prevents commodity from contacting the two constant force springs and spring block within the spring housing. The inset plate is preferably welded to the interior wall surfaces of spring housing. The inset plate functions as (i) a mechanical stop for the stem valve sealing disc during operation and (ii) a barrier that prevents fluids and contaminants from contacting the constant force springs.

The spring housing also preferably includes four longitudinal slots within the spring housing uppermost edge. The four long longitudinal slots preferably (i) cooperate as two pairs and (ii) receive two inserted drum pins at their corresponding slot bottommost points (iii) wherein these drum pins are in parallel alignment with (i) each other and (ii) the circular lower valve flange upper surface. The four longitudinal slots also create a secure fit between the drum pins and spring housing when the constant force springs are deflected. The four longitudinal slots are preferably identical to each other in shape and dimensions.

The spring housing of the present invention preferably contains a single spring block, and this spring block is centrally positioned within the spring housing interior space. The spring block is preferably a rectangular solid with flat, hard and smooth sides and includes a (i) top spring block side (ii) bottom spring block side (iii) first lateral opposing side and (iv) second laterally opposing side (v) an anterior block opposing side and (vi) a posterior block opposing side. This spring block preferably has a single circular vertical spring block aperture for insertion of the valve stem whenever pressure relief valve is properly assembled. This spring block aperture is preferably equidistantly positioned from the four corners of the spring block rectangular upper surface. The circular vertical spring block aperture is continuous from the bottom spring opposing block side to the top spring opposing block side for insertion of the valve stem.

The opposing first lateral spring block side and the second opposing second lateral spring block side are preferably (i) opposing to (ii) parallel to and (iii) congruently aligned with each other. Each opposing spring block side preferably contains one horizontal oriented threaded circular aperture, and these two horizontally oriented threaded circular apertures are congruently aligned with each other. These threaded circular apertures also preferably (i) directly oppose each other and (ii) are continuously connected to each other by a longitudinal bore within the spring block. Each threaded aperture preferably contains an inserted single corresponding spring bolt end whenever the vacuum relief valve is properly assembled. Each spring bolt also inserts within one end of a single corresponding constant force spring at its second spring bolt end. Preferably each of the two constant force springs is located on corresponding lateral opposing sides of the spring block.

In addition to its attachment to spring block by a spring bolt, each constant force spring coils around a corresponding single spring drum. Each spring drum thereby operates as a smooth relatively frictionless circular surface upon which each constant force spring uncoils (deflects) during spring rotation. Deflection of the constant force spring is preferably initiated by (i) a corresponding drum pin which is located within (ii) the longitudinal bore of a corresponding spring drum. Each corresponding drum pin also lies within two opposing valve longitudinal slots within the spring housing uppermost edge and interior surface. Each corresponding drum pin thereby (i) maintains each drum and corresponding constant force spring in the same position within the spring housing (ii) while each corresponding spring drum rotates and constant force spring coils or uncoils (deflects).

Positioned upon and attaching to the spring housing uppermost edge is preferably a single valve cover. This valve cover is preferably (i) made of a rectangular steel plate (ii) with a longitudinal pipe segment welded to the valve cover bottom surface in a position equidistant from the corners of the cover. The valve cover preferably attaches to the spring housing with four socket head cap screws. The valve cover protects the constant force springs within the spring housing from weather. The longitudinal pipe segment guides the valve stem (i) in vertical coaxial alignment (ii) within spring housing interior space and valve body interior cavity. The longitudinal length of pipe segment is also perpendicular to the valve upper flange surface. Preferably a single rectangular valve cover gasket provides a second sealing barrier between the valve cover and the spring housing uppermost edge. This valve cover gasket also prevents exterior moisture and debris from seeping into the constant force springs and attached spring block from the joint or junction between the valve cover and spring housing.

The constant force springs attain a predetermined valve pressure (i) by torquing (rotating) the valve stem (ii) until the constant force springs are deflected a specific corresponding magnitude (iii) by the vertical movement of the attached valve stem and spring block. The force of the vertically moving spring block, translated from the torque upon valve adjustment nut on the uppermost valve stem end, causes the constant force springs to deflect.

The adjustment nut maintains the springs in this specific deflected position by tightly contacting the upper spring block surface and valve stem. In turn, the extent of deflection depends upon the preset torque of the valve shaft. The preset torque determines at which negative pressure, from the operatively attached tank, the spring block will vertically elevate or drop, thereby translating more or less tension to the constant force springs. This valve preset pressure in an upward direction must be overcome by the opposing force from the vacuum within the tank if atmospheric air is to enter the valve. When this vacuum becomes greater than the valve preset pressure, the valve stem, together with the attached springs and spring block, moves vertically downward within the valve cavity. As the valve stem moves downward, the valve stem lower sealing disk and circular valve seal drop vertically from contact with the valve body inventor cavity wall and thereby allow atmospheric air to enter the valve body interior cavity.

As the tank vacuum dissipates constant force springs deflect to their original positions, thereby pulling the valve stem vertically upward. Once the springs regain their original biased vertical position, the joint created by lower sealing disc and valve seal once again become leak tight physical barriers by abutting the valve body cavity interior wall surface. Because of the continuing preset pressure of the constant force springs, at the critical vacuum pressure, atmospheric air will enter the tank at a continuous constant flow rate in the absence of a diminishing opposing tank pressure.

Accordingly, it is one goal of the invention to provide a vacuum relief valve in which a negative pressure within a tank need not increase in magnitude beyond the initial preset valve opening pressure to achieve a predetermined maximum valve venting capacity.

It is another goal of the invention to provide a vacuum relief valve in which leakage of commodity between the valve interior surface and the valve stem lower disc is diminished by a seal comprising a flat cut gasket.

It is another goal of the present invention to provide a vacuum relief valve in which leakage between a valve stem and a vale stem lower disc is eliminated by a continuous weld.

It is another goal of the invention to provide a baffle to reduce splashing of commodity upon the valve stem and sealing components.

It is another goal of the invention to minimize exposure of the constant force springs to environmental contaminants.

These advantages and other advantages of the invention are further illustrated by THE DETAILED DESCRIPTION OF THE PREFERRED EMBODIMENT OF THE INVENTION AND OTHER EMBODIMENTS and the appended drawings.

BRIEF DESCRIPTION OF THE DRAWINGS

FIG. 3A illustrates an upper plan view of the vacuum relief valve of FIG. 2.

FIG. 3B illustrates a lowermost plan view of the fully assembled vacuum relief valve of FIG. 2.

FIG. 3C illustrates the anterior view of the fully assembled vacuum relief valve of FIG. 2.

FIG. 3D illustrates a lateral view of the fully assembled vacuum relief valve of FIG. 2.

FIG. 4A illustrates a close up top plan view of the valve body of FIG. 2.

FIG. 4B illustrates a cutaway anterior view of the valve body along line BB of FIG. 4A.

FIG. 4C illustrates a lateral view of the valve body of FIG. 2.

FIG. 4D illustrates an isometric partial anterior view of the valve body of FIG. 2.

FIG. 5A illustrates a close up top plan view of the valve stem of FIG. 2.

FIG. 5B illustrates a cutaway anterior view of the valve stem along line CC of FIG. 5A.

FIG. 5C illustrates an isometric exploded view of the valve stem of FIGS. 5A and 5B.

FIG. 5D illustrates an inverted isometric view of the valve stem.

FIG. 6A illustrates a top plan view of a spring housing in the valve assembly of FIG. 2.

FIG. 6B illustrates a cutaway anterior view of the spring housing along line DD of FIG. 6A.

FIG. 6C illustrates an isometric view of the spring housing in FIGS. 6A and 6B.

FIG. 7 illustrates an isometric exploded view of the constant force springs and spring block for the valve assembly of FIG. 2.

FIG. 8A illustrates a close up isometric view of the modified baffle for the vacuum relief valve of FIG. 2.

FIG. 8B illustrates a close up isolated anterior view of the modified baffle for the relief valve of FIG. 8A.

FIG. 8C illustrates a close up top plan view of the modified baffle of FIGS. 2 and 8A.

FIG. 9A illustrates an anterior cutaway view of the vacuum relief valve of FIG. 2 in an open configuration during which atmospheric air enters the valve body cavity.

FIG. 9B illustrates an upper plan view of the vacuum relief valve of FIG. 2 through the spring housing.

FIG. 10 illustrates an isometric partial anterior cutaway view of the modified baffle and a retaining ring within the valve body interior cavity.

DETAILED DESCRIPTION OF THE PREFERRED EMBODIMENT AND OTHER EMBODIMENTS

Valve Body 1

Figure 1:
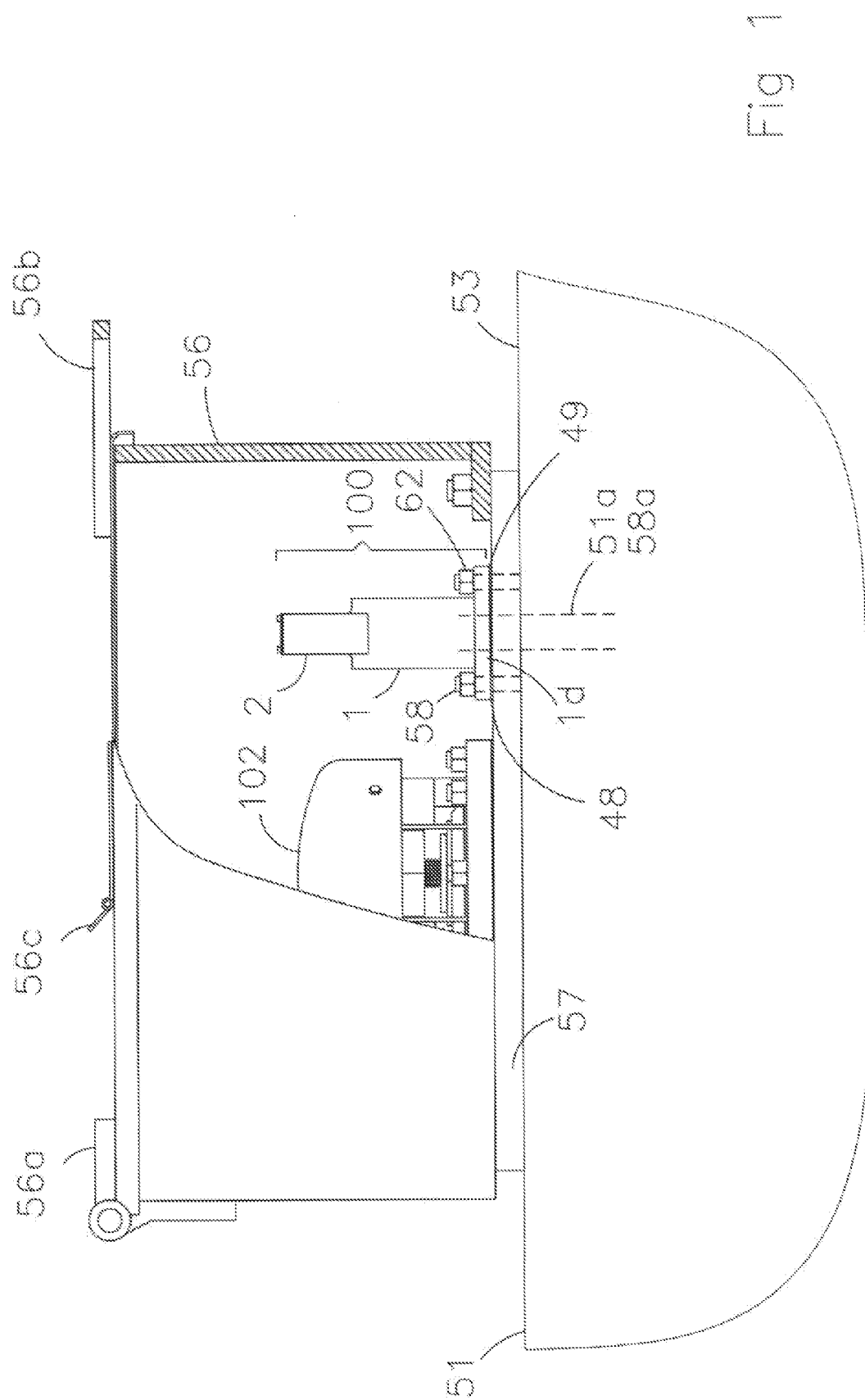
FIG. 1 illustrates the anterior cutaway view of the preferred embodiment of the vacuum relief valve attached a railroad tank car.

Referring initially to FIGS. 1, 2, 3A, 3B, 3C, 4A, 4B, 4C, and 4D, vacuum relief valve 100 in the preferred embodiment comprises a single valve body 1. Valve body 1 comprises exterior valve body wall surface 1*t* and valve body interior cavity wall surface 1*v*. Valve body 1 also comprises an interior continuous valve body cavity 1*x*, and cavity 1*x* is formed by continuous valve body interior wall surface 1*v*.

Valve body 1 preferably comprises a circular lower valve body flange 1*b* at valve body lowermost edge 1*r*. Circular lower valve body flange 1*b* preferably has a (i) diameter of five inches and (ii) height of 0.57 inch. Circular lower valve body flange 1*b* preferably contains a concentrically positioned lower body flange circular opening 1*d* that is preferably 2.054 inches in diameter. Lower body flange circular opening 1*d* is preferably continuous with valve body interior cavity 1*x*. Lower body flange opening 1*d* preferably also can concentrically align with tank opening 51*a* within a tank or other closed container 51 so that liquid or air can flow between lower body flange opening 1*d* and tank opening 51*a*. Valve body lower exterior lower mounting surface 1*s* is preferably prepared with a one-sixteenth raised spiral serrated finish 64. However, valve body lower exterior mounting surface 1*s* may also be prepared with a mounting tongue 65. Lower valve body flange also preferably has a hard smooth rigid exterior surface 1*tt*.

Referring to FIGS. 3A, 3B, 3C, 4A and 4B, lower valve body flange 1*b* preferably has (i) a flat upper circular exterior flange surface 1*o* and (ii) a lower circular mounting surface 1*s*. Lower circular mounting surface 1*s* is preferably co-extensive with, and the same structure as, lower mounting surface of valve body 1*a*. Lower body flange 1*b* also preferably includes a single circular exterior flange wall 1*q* that is preferably perpendicular to circular upper and lower flat flange surfaces 1*o* and is respectively. Upper and lower circular flange surfaces 1*o*, is respectively are parallel to each other and perpendicular to the longitudinal length 1*l* of valve body upper longitudinal tube 1*a*, infra. Lower valve body flange 1*b* preferably comprises four equidistantly spaced circular stud apertures 1*e*, 1*f*, 1*g* and 1*h* [collectively stud apertures 1*i*], and each stud aperture 1*i* is preferably three-quarters inch in diameter. As seen in FIG. 1, each stud aperture 1*i* receives a corresponding inserted valve mounting stud 58, and preferably valve mounting studs 58 attach vacuum relief valve 100 to a tank surface or other closed container surface 53.

Valve body 1 includes a valve body upper longitudinal cylindrical tube 1*a*, and tube 1*a* preferably integrally attaches to upper circular flange surface 1*o* in a concentric co-axially aligned manner. Valve body upper longitudinal tube 1*a* is preferably rigid, smooth, hard and cylindrical in shape with a longitudinal length 1*l* that is preferably perpendicular to valve body lower circular flange 1*b*. Valve body upper longitudinal tube 1*a* preferably has (i) an exterior diameter of 2.629 inches and (ii) a longitudinal length of 4.582 inches. Upper valve body tube 1*a* preferably has (i) a concentrically positioned upper valve body longitudinal tube bore 1*p* that (i) opens at uppermost valve body tube edge 1*c* and (ii) is continuous with valve body interior cavity 1*x* and lowermost valve body opening 1*d*. Preferably valve body longitudinal bore 1*p* is rigid and concentrically positioned within valve body longitudinal tube 1*a*.

As best seen in FIG. 4B, upper valve body longitudinal tube bore 1*p* flares downward towards valve flange 1*b* to form continuous conical seat 1*k* which preferably conical in three dimensions. Within conical valve seat 1*k* is a continuous series of conical seat points 1*kk* along valve interior wall surface 1*v*, and points 1*kk* are all vertically equidistant from lower valve flange upper surface 1*o*.

As best seen in FIG. 4B, valve conical seat 1*k* comprises the upper portion of continuous valve body cavity interior wall surface 1*v*. Valve conical seat 1*k* is continuous with the hollow continuous cylindrical shape of valve body interior cavity interior wall surface 1*v*. Valve conical seat is also conical in three dimensions, and decreases in diameter towards valve body uppermost end 1*c*. Conical seat 1*k* is preferably (i) 1.282 inches in upper diameter (ii) 1.97 inches in lower diameter and (iii) 0.346 inches in height. These dimensions are not those dimensions of previously existing vacuum relief valves. Conical seat 1*k* preferably (i) diverges from valve body uppermost longitudinal tube edge 1*c* at an angle of 45 degrees and (ii) forms a single continuous circle of conical seat points 1*kk*. Valve stem lower disc radius 4*t* and valve seal 8 abut conical seat points 1*kk* to form a single leak-free abutment and joint whenever vacuum relief valve 100 is in its closed biased configuration.

Figure 9C:
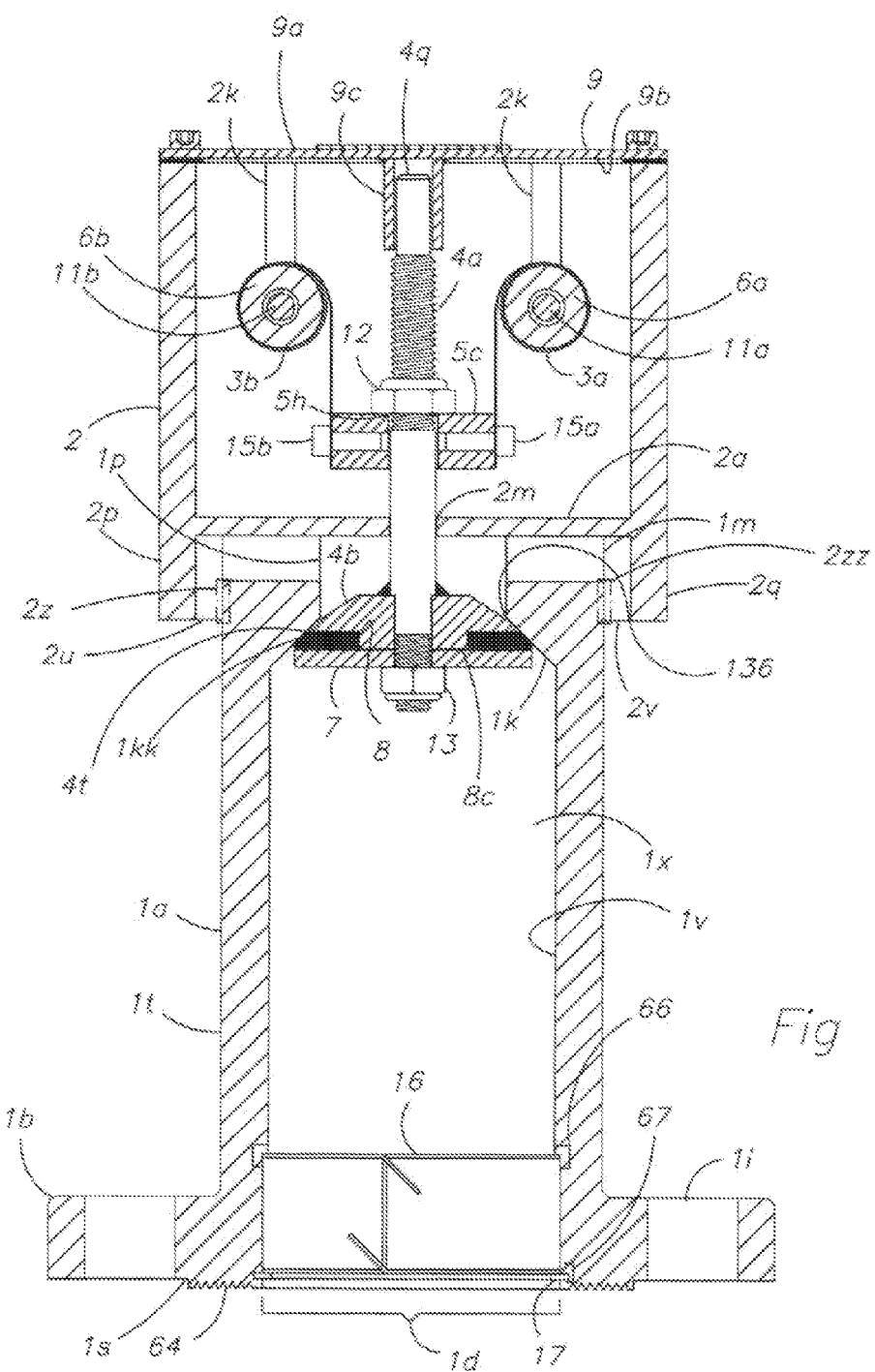
FIG. 9C illustrates anterior cutaway view of the vacuum relief valve of FIG. 2 in a biased closed configuration.
Figure 11:
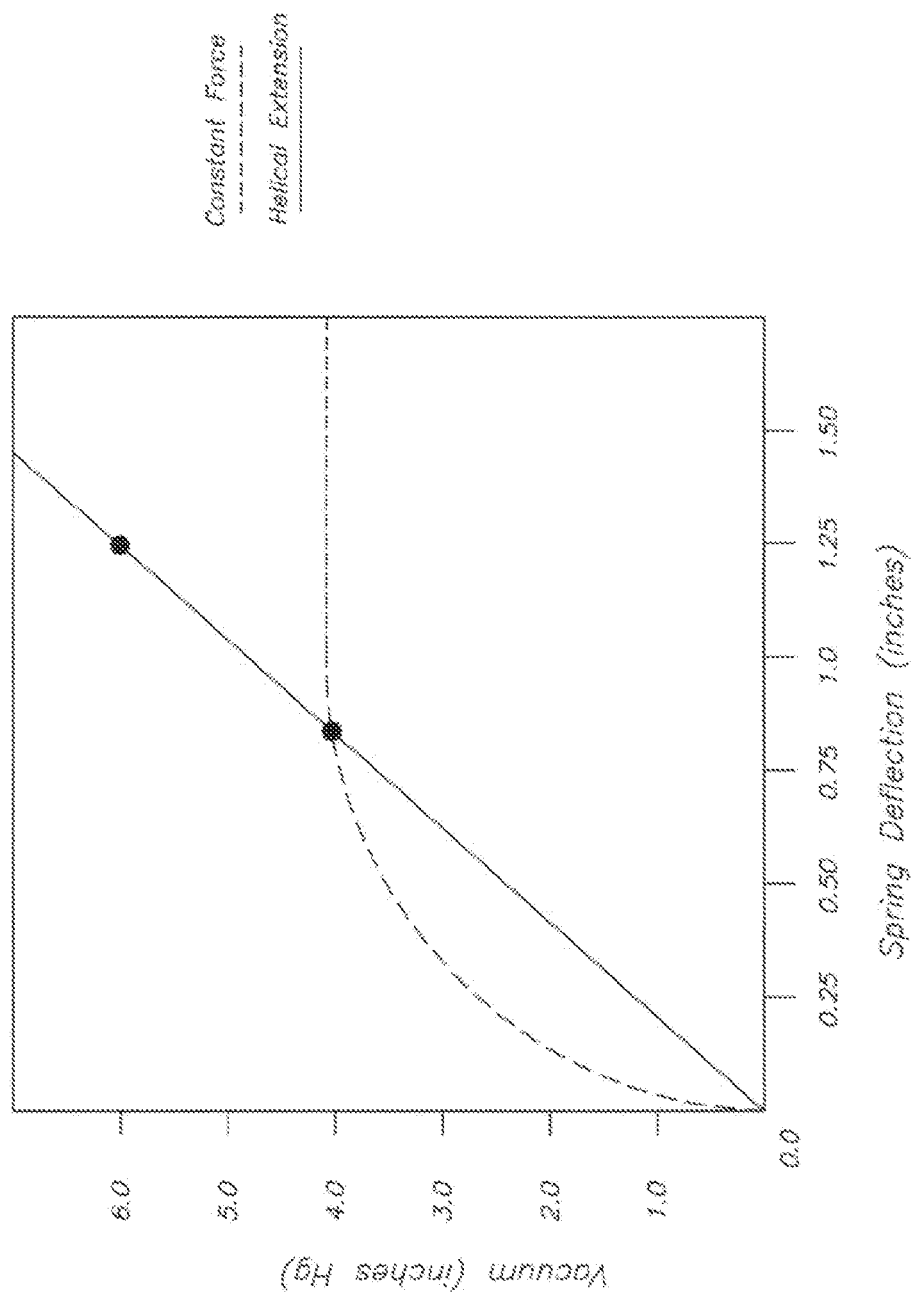
FIG. 11 is a graphical illustration of the qualitative and quantitative differences in deflection of a helical spring and constant force spring as load increases.

Referring to FIG. 9C, preferably valve body interior wall 1*v* contains a (i) single continuous circular baffle retaining machined edge 66 and (ii) lowermost valve circular retaining ring groove 67. Referring to FIGS. 4A, 4B, 4C and 4D, valve body upper longitudinal tube end 1*c* contains a single valve body rectangular groove 1*m*. Rectangular groove 1*m* completely encompasses the opening of valve body longitudinal bore 1*p* at valve body longitudinal tube uppermost end 1*c*. Valve body rectangular groove 1*m* is preferably (i) 0.198 inch in depth and (ii) 1.125 inches in width. Valve body rectangular groove 1*m* preferably has a bottom flat floor 1 mm.

Figure 14:
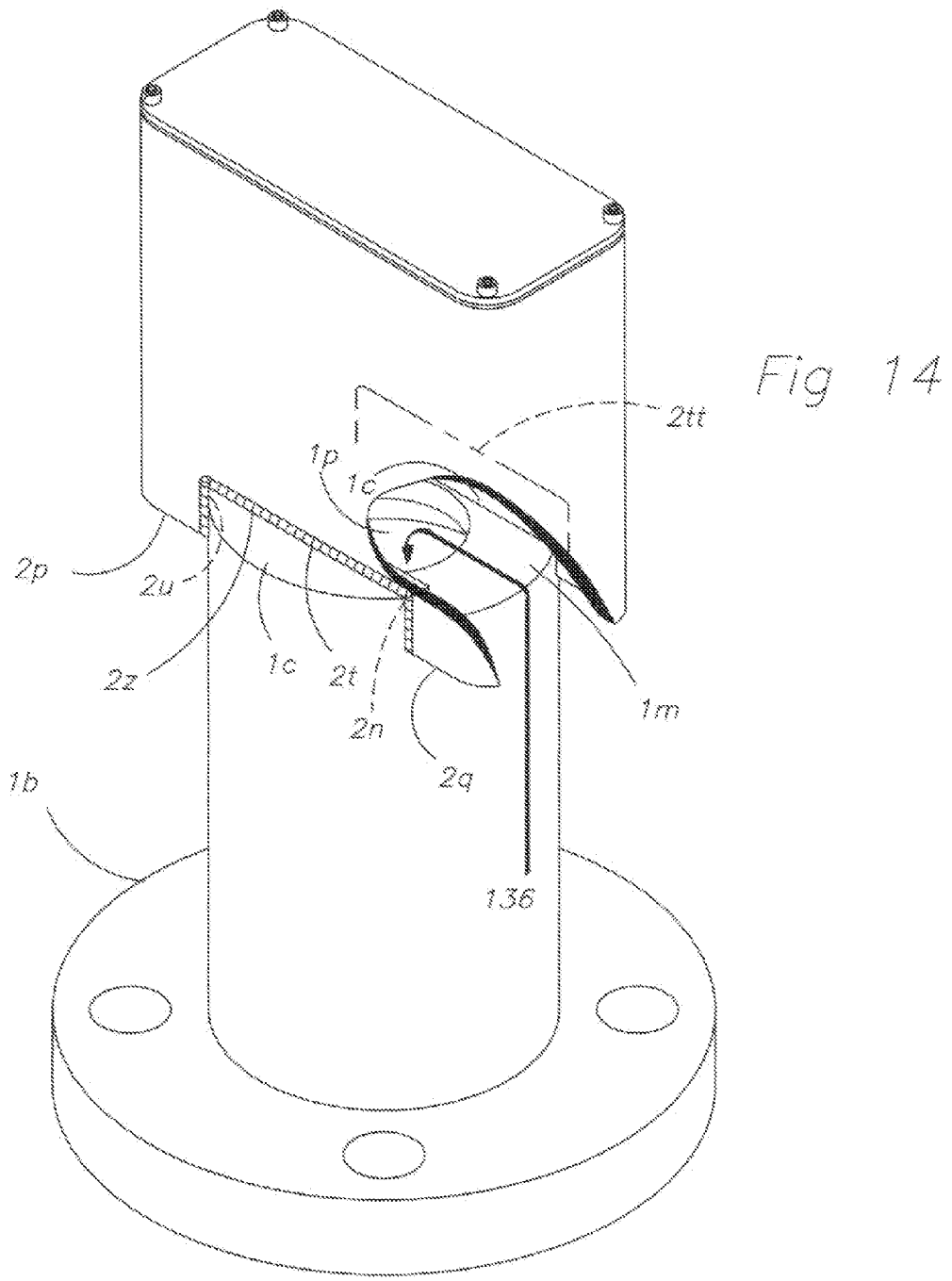
FIG. 14 is an isometric partial anterior cutaway view of the vacuum relief valve of FIG. 2 which illustrates initial atmospheric air flow into the valve of FIG. 2.

As best seen in FIGS. 9A and 14, valve body rectangular groove 1*m* facilitates atmospheric air 136 to enter or exit valve body interior cavity 1*x* (i) under spring housing lower protruding curved legs 2*p*, 2*q* infra and (ii) along valve body uppermost longitudinal tube surface 1*c*. Valve body rectangular groove 1*m* preferably contains a single uppermost opening of valve body longitudinal bore 1*p* that is preferably equidistantly located from each corner of rectangular groove 1*m*. Upper circular valve bore 1*p* receives inserted valve stem 4 preferably (i) in vertical co-axial alignment with valve body longitudinal tube bore 1*p* and (ii) perpendicular to lower valve body flange uppermost surface 1*o*.

Spring Housing 2

Figure 6D:
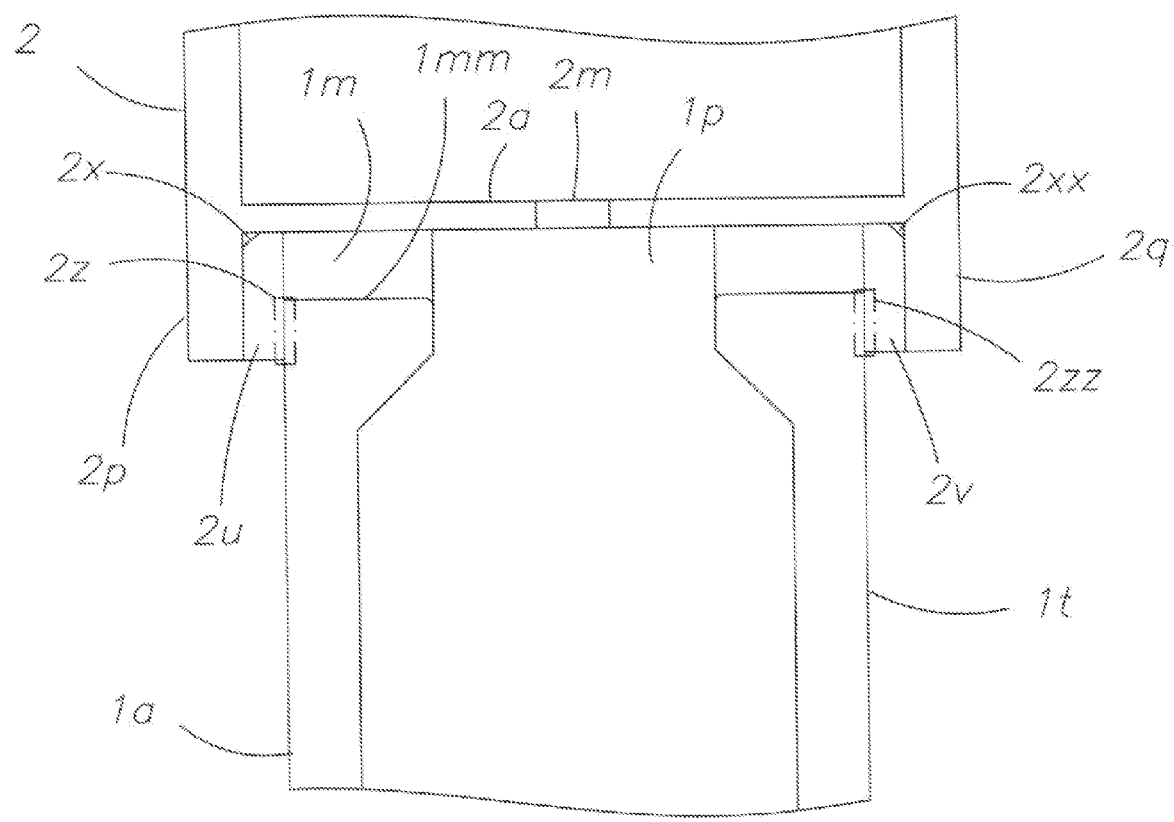
FIG. 6D illustrates an anterior cutaway view of the weld attachment of spring housing to the valve body upper longitudinal tube.

Referring to FIGS. 1, 2, 3C, 3D, 6A, 6B, 6C and 6D, spring housing 2 preferably (i) attaches to upper valve body uppermost surface 1*c* and valve body longitudinal tube exterior surface 1*t* (ii) in vertical alignment with valve body uppermost surface 1*c*. Spring housing 2 is a single tube-like component that is preferably (i) rectangular in cross section (ii) three and one-half inches wide (iii) one and one-half inches in depth and (iv) 3.16 inches in height. Spring housing 2 is preferably made of 304 stainless steel. Spring housing 2 also comprises first opposing curved protrusion lowermost leg 2*p* and second opposing curved protrusion lowermost leg 2*q* respectively. Referring to FIGS. 6D and 14, first opposing curved protrusion lowermost leg 2*p* has a first lower curved protruding leg interior surface 2*u*, while second opposing curved protrusion lowermost leg 2*q* has a second lower curved protruding leg interior lower curved surface 2v. Spring housing 2 preferably have (i) a hard, rigid and flat exterior surface 2r and (ii) a hard, rigid flat interior surface 2o.

As best seen in FIGS. 6B and 6C, spring housing 2 preferably comprises a single continuous uppermost rectangular spring housing upper edge 2j, and housing 2 is open at continuous uppermost spring housing edge 2j. Continuous uppermost spring housing edge 2j preferably comprises a single circular spring housing corner aperture 2i, 2k, 2l and 2n respectively [collectively corner apertures 2r] at each corresponding spring housing corner 2ii, 2kk, 2ll and 2nn respectively [collectively 2rr]. Referring to FIGS. 6D and 14, spring housing 2 is preferably welded to valve body upper longitudinal tube 1a at 2z, 2zz along (i) first and second interior lower curved protruding leg interior surfaces 2u, 2v respectively (ii) valve body exterior surface 1t and (iii) valve body uppermost tube surface 1c.

Spring housing 2 comprises first and second spring housing opposing lowermost longitudinal edges 2t, 2tt respectively. First and second spring housing opposing lowermost longitudinal edges 2t, 2tt respectively preferably (i) oppose each other along each corresponding opposing width w2 of spring housing 2 and (ii) are continuous with and alternate between curved protruding lowermost legs 2p, 2q.

As best seen in FIGS. 6A and 6B, spring housing 2 preferably comprises (i) a single lower inset plate 2a that is preferably (i) rectangular in shape and with (ii) a three-eighths inch radius curve in each inset plate corner 2aa, 2bb and 2cc, 2dd [collectively 'inset plate corners 2ee']. Insert plate 2a preferably has an upper hard, smooth flat insert plate surface 2aa and a lower hard smooth flat insert plate surface 2bb. Preferably each inside corner radius of spring housing 2 is 0.188 inch, while each outside corner radius of inset plate 2a is 0.17 inches. To reduce manufacturing costs, inset plate corners 2aa, 2bb, 2cc, 2dd respectively preferably snugly insert into the corresponding inside corners 2s, 2t, 2y and 2z (not seen) respectively of spring housing 2.

Spring housing 2 is preferably made from (i) a 3.5 wide by 1.5 inch deep hollow longitudinal metal tubing, wherein (ii) this tubing is preferably rectangular in cross-sectional shape and (iii) the tubing is preferably made of 304 or 316 stainless steel. Lower inset plate 2a serves as a barrier to atmospheric air 136; as a result moisture and debris do not contact and degrade constant force springs 3a, 3b infra. Lower inset plate 2a also functions as a mechanical stop for vertical downward movement of valve stem 4. Single insert plate 2a is preferably 0.4 inches below spring housing uppermost edge 2j.

Referring to FIGS. 6A, 6B and 6C, lower inset plate 2a integrally and continuously attaches to spring housing interior surface 2o by inset plate welds 2x, 2xx. Lower inset plate 2a preferably attaches to spring housing interior surface 2o in (i) a horizontal manner and (ii) perpendicular to the longitudinal length 13 of spring housing wall 2r. Inset plate 2a is also preferably (i) uniformly positioned parallel to valve body flange upper surface 1o and (ii) 0.59 inches from lowermost curved protruding leg edges 2y, 2yy to prevent rain from entering valve body 1.

Lower inset plate 2 is parallel to valve body uppermost surface 1c whenever spring housing 2 is properly attached to valve body 1. Lower inset plate 2a preferably contains a single circular inset plate aperture 2m, and circular inset plate aperture 2m is preferably three-eight inch in diameter. Circular inset plate aperture 2m is preferably equidistantly positioned from each inset plate corner 2aa, 2bb, 2cc and 2dd. As best seen in FIGS. 9A and 9C, inset plate circular aperture 2m provides a tight fit for inserted valve stem 4, and this tight fit prevents fluid commodity from entering spring housing interior 2ttt.

As best seen in FIGS. 6A, 6B and 6C, first, second, third and fourth valve longitudinal slots 2e, 2f, 2g, 2h respectively [collectively valve longitudinal slots 2k] are located within spring housing uppermost rectangular edge 2j. Valve longitudinal slots 2k are each preferably (i) one-quarter inch in width (ii) one-eighth inch in depth and (iii) 1.12 inches in longitudinal length 12. Each valve slot 2e, 2g, 2f, 2h is suitably contoured, preferably as a partially elongated elliptical shape, for insertion of two opposing ends of a corresponding single first drum pin 11a and a second single drum pin 11b respectively. Valve slots 2k completely penetrate spring housing wall 2r or uppermost spring housing edge 2j.

Each drum pin 11a, 11b is preferably placed within two opposing valve longitudinal slots, such as 2e, 2g and 2f, 2h. In this manner, the longitudinal lengths 14 of drum pins 11a, 11b within slots 2k preferably align (i) parallel to each other and (ii) perpendicular to the longitudinal height 11 of valve body upper longitudinal tube 1a. Each longitudinal slot 2k is preferably 0.525 inch from the closest spring housing corner 2aa, 2bb, 2cc or 2dd as the case may be. First and second drum pins 11a, 11b respectively within their respective corresponding slots 2k preferably maintain parallel alignment, support and rotation of a (i) first single constant force spring 3a and (ii) single second constant force spring 3b respectively, infra. Each drum pin 11a, 11b slides downward through its corresponding slots 2k during assembly, and thereafter drum pins 11a, 11b rotate during valve operation. Slots 2k doe not completely penetrate housing wall 2r or uppermost spring housing edge 2j so that spring housing 2 maintains its weather tight feature. Each drum pin 11a, 11b is preferably positioned at the bottommost point of each slot 2k after assembly and during operation of valve 100.

Constant Force Springs 3a, 3b and Spring Block 5

Referring to FIGS. 2, 7, 9A and 9C, preferably (i) a single rigid hard spring block 5 (ii) first and second constant force springs 3a, 3b respectively (iii) first and second spring drums 6a, 6b respectively (iv) first and second bolts 15a, 15b respectively and (v) first and second drum pins 11a, 11b respectively comprise a single valve biasing assembly 26. Valve spring block 5 is preferably (i) centrally positioned within spring housing 2 (ii) a three-dimensional solid (iii) rectangular in perpendicular cross-section (iv) one and one-eight inch in width (v) one inch in depth (vi) three-eighths inch in thickness and (vii) made of 304 stainless steel.

Valve spring block 5 has (i) a first lateral opposing spring block side 5a (ii) a second lateral opposing spring block side 5b (iii) an upper opposing spring block side 5c (iv) a lower opposing spring block side 5d (v) an anterior opposing spring block side 5e and (vi) a posterior opposing spring block side 5f [collectively 'spring block sides 5ii' ]. Each opposing block side 5ii is preferably smooth, hard, rigid and rectangular in shape. Spring block 5 preferably includes a (i) single first circular opposing #5-40 threaded aperture 5i within spring block first lateral opposing side 5a and (ii) single second horizontal circular opposing #5-40 threaded aperture 5j within spring block second lateral opposing side 5b. This designated size is a standard accepted American Society of Mechanical Engineers measurement designation wherein (i) #5 is the diameter and (ii) 40 indicates threads per inch for screws and screw apertures.

Circular opposing #5-40 spring block threaded apertures 5i, 5j respectively are each preferably (i) one-eighth inch in circular diameter and (ii) congruently positioned with, and opposing each other, along first and second spring block opposing lateral sides 5a, 5b respectively. Each circular opposing #5-40 spring block threaded aperture 5l, 5j respectively preferably (i) is equidistantly positioned from (ii) the corners of their respective valve spring block lateral opposing sides 5a, 5b respectively. Threaded block apertures 5i, 5j are preferably continuous through the interior of valve spring block 5 with (i) straight spring block bore 5k and (ii) with each other. Preferably horizontal circular opposing #5-40 threaded apertures 5i, 5j respectively each receive an inserted spring bolt 15a, 15b respectively within a single properly assembled biasing assembly 26. Each opposing #5-40 spring block threaded aperture 5i, 5j respectively and each corresponding spring bolt 15a, 15b respectively preferably (i) cooperate to attach a single corresponding constant force spring 3a, 3b respectively (ii) to a corresponding opposing lateral spring block side 5a, 5b respectively.

As best seen in FIG. 7, valve spring block 5 preferably has a single spring block large circular aperture 5h that is preferably (i) 0.345 inch in circular diameter and (ii) opens at upper opposing spring block side 5c and lower opposing spring block side 5d. Spring block aperture 5h is the threaded opening through which valve stem 4 passes to reach valve body interior cavity 1x through spring housing inset plate 2a. Spring block aperture 5h is equidistantly spaced from each corner of upper opposing spring block side 5c. Spring block aperture 5h is the opening with which inserted valve stem 4 cooperates to change the deflection of constant force springs 3a, 3b.

Referring to FIGS. 2, 7, 9A and 9C, each first constant force spring 3a and each second constant force spring 3b is preferably (i) made of 301 stainless steel (ii) one inch in width (iii) 0.008 inch in thickness and (iv) six inches in longitudinal length. The helical diameter 55 of each constant force spring 3a, 3b is preferably 0.581 inch whenever either spring 3a, 3b is completely coiled. Each constant force spring 3a, 3b has a proximal spring end 3i and a distal spring end 3h. Most preferably there is a single leaf 30c for each constant force spring 3a, or 3b, because the load upon each spring 3a, 3b is minimal; typically each spring 3a, 3b provides approximately 6.4 pound of force at full defection. Each first and second constant force spring 3a, 3b respectively preferably contains a corresponding first circular spring aperture 3c and a second circular spring aperture 3cc respectively at its corresponding proximal spring end 3i. Each first and second circular spring aperture 3c, 3cc respectively is preferably 0.13 inch diameter. Preferably there are two constant force springs 3a, 3b with a single biasing assembly 26, but other numbers of constant force springs 3a, 3b are also within the scope of this invention.

First and second circular spring block apertures 3c, 3cc respectively are each preferably 0.31 inches from a corresponding proximal spring end 3i. Each first and second #5-40 spring block threaded aperture 5i, 5j respectively provides an insertion point for (i) proximal spring bolt ends 15c of (ii) first spring bolt 15a and second spring bolt 15b respectively. Each circular spring aperture 3c, 3cc respectively provides the insertion point for the corresponding distal spring bolt end 15d of each spring bolt 15a, 15b respectively. Each spring bolt 15a, 15b is preferably identical to the remaining bolt 15a, 15b.

Figure 2:
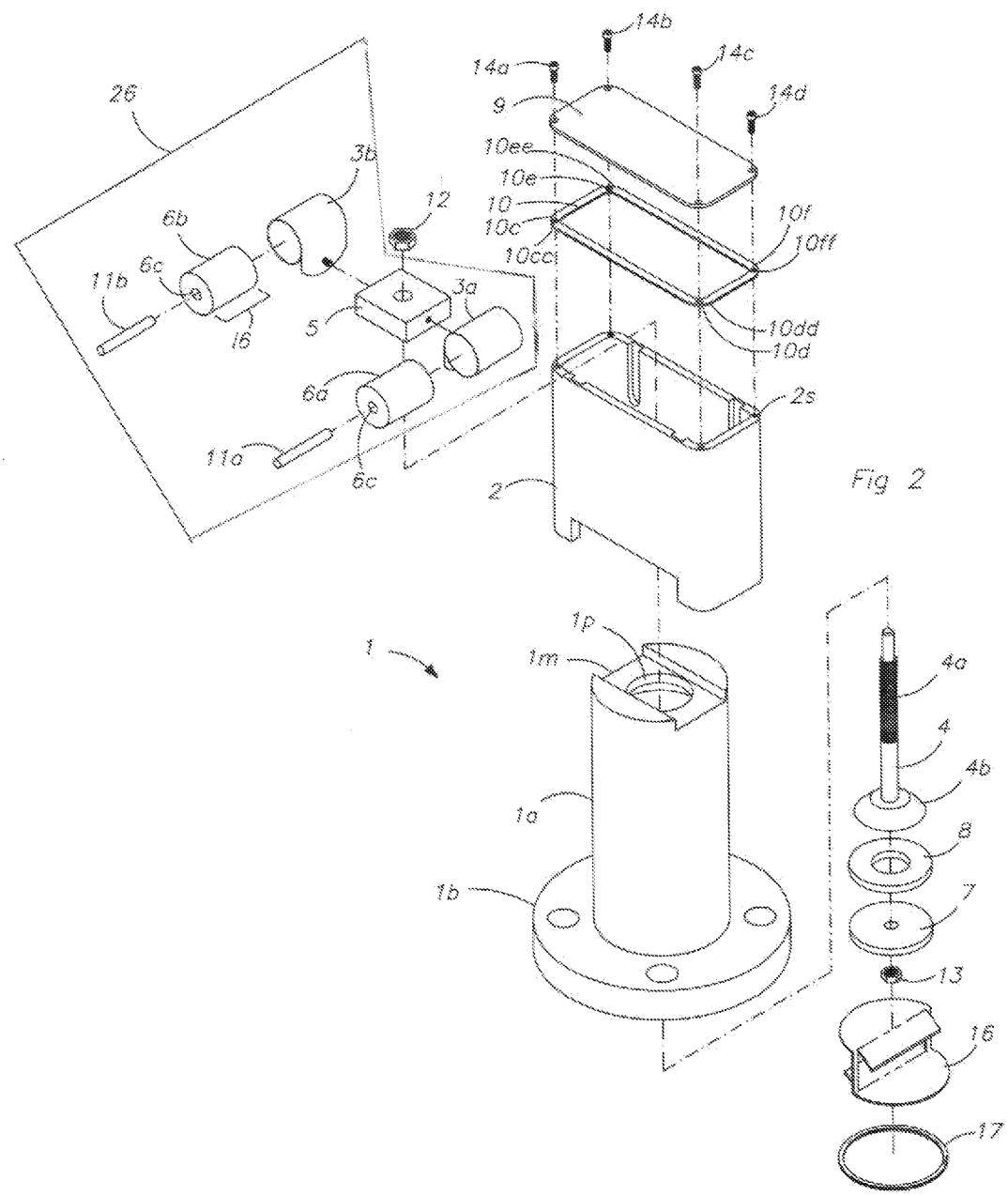
FIG. 2 illustrates an exploded view of the preferred embodiment of the vacuum relief valve.

Referring to FIG. 2, each first spring drum 6a and second spring drum 6b is preferably (i) cylindrical in longitudinal shape (ii) 1.06 inches in longitudinal length (iii) 0.58 inch in cross-sectional diameter (iv) made of nylon 6/6 (an industry recognized polyamide) with a smooth surface and (v) identical to the other. Each spring drum 6a 6b respectively preferably inserts within a corresponding coiled constant force spring 3a, 3b respectively within a properly assembled biasing assembly 26. Each spring drum 6a, 6b contains a concentrically positioned rigid hard and straight spring drum cylindrical bore 6c, and bore 6c is preferably 0.19 inch in perpendicular cross-sectional diameter. Each spring drum circular bore 6c is preferably co-extensive with the longitudinal length 16 of its corresponding spring drum 6a, 6b.

Referring to FIGS. 2, 7, 9A and 9C, each first and second spring drum 6a, 6b respectively inserts within a coiled or partially uncoiled constant force spring 3a, 3b respectively in longitudinal parallel alignment with a corresponding constant force spring cylindrical interior 55. In a properly assembled vacuum relief valve 100, a first spring drum pin 11a or a second spring drum pin 11b is inserted into a corresponding spring drum circular bore 6c. As each drum pin 11a, 11b rotates, the corresponding spring drum 6a, 6b rotates. The rotation of spring drums 6a, 6br respectively within each constant force spring 3a, 3b respectively reduces friction between (i) rotating pins 11a, 11b and (ii) corresponding constant force springs 3a, 3b as constant force springs 3a, 3b deflect. In the preferred embodiment, constant force spring 3a will deflect to the same extent as constant force spring 3b when subjected to the same translated torque from spring block 5. In other embodiments, there may be more or fewer than two constant force springs 3a, 3b. In still other embodiment each constant force spring 3a, 3b may comprise other dimensions and measurements.

First drum pin 11a and second drum pin 11b are each preferably a metal shaft made of 304 stainless steel. Drum pins 11a, 11b are each preferably (i) three-sixteenths inch in cross-sectional diameter and (ii) one and five-sixteenths inches in longitudinal length. Each drum pin 11a, 11b respectively properly aligns (i) a corresponding spring drum 6a, 6b respectively and constant force spring coil 3a, 3b respectively (ii) during rotation of each corresponding spring drum 6a, 6b and deflecting constant force spring 3a, 3b. Simultaneously, first and second spring bolts 15a, 15b respectively operatively attach each corresponding constant force spring 3a, 3b to the corresponding opposing spring block lateral side 5a, 5b at corresponding spring block #5-40 circular aperture 5i, 5j respectively.

Valve Stem 4 and Co-Axially Aligned Components

Referring to FIGS. 2, 5A, 5B, 5C and 5D, valve stem 4 preferably includes (i) an uppermost smooth stem segment 4p (ii) an upper machined threaded valve shaft 4d (iii) a smooth intermediate valve stem segment 4m (iv) a single attached lower circular valve sealing disc 4b and (v) a lower machined shaft segment 4e. Valve stem 4 also has an uppermost valve stem end 4q and a lowermost valve stem end 4r. Valve shaft 4a preferably comprises (i) uppermost stem segment 4p (ii) upper machined valve shaft 4d (iii) smooth intermediate valve stem segment 4q and (iv) lower machined threaded valve shaft 4e. Valve shaft 4a is preferably made of 316 stainless steel.

Valve shaft 4a is preferably (i) 3.7 inches in longitudinal length and (ii) five/sixteenths inch in perpendicular circular cross-sectional diameter. Upper valve stem threaded section 4d is preferably (i) 1.2 inches in longitudinal length and (ii) 5/16-24 NF, that is, 5/16 inch in diameter with twenty-four threads per inch according to the National Fine Thread Standard ANSI/ASME B1.M-1986 of the American National Standards Institute and American Society of Mechanical Engineers Lower valve sealing disc 4b is preferably (i) circular along its circumference at continuous circular sealing disc exterior edge 4g, but (ii) is generally trapezoidal in shape in perpendicular cross section as best shown in FIG. 5B. Upper sealing disc surface 4h comprises an exterior circular disc rounded step 4j and an interior rounded step 4jj. Preferably valve shaft 4a and lower circular valve sealing disc 4b integrally continuously attach to each other by circular disc weld 4k at (i) upper interior sealing disc step 4jj and (ii) circular sealing disk aperture 4n. Disc weld 4k is preferably made of stainless steel AWS ER319 material as designated by the American Welding Society. As best seen in FIGS. 5D and 9C, valve stem sealing disc 4b preferably has a sealing disc stepped lower surface 4s, and surface 4s preferably consists of (i) exterior circular step 4i and (ii) interior circular step 4ii. Lower sealing disc 4b is preferably made of 316 stainless steel.

Lower circular valve sealing disc 4b preferably includes (i) a single lower circular valve radius 4t (ii) of 45 degrees along sealing disc exterior circular edge 4g. Radius 4t preferably (i) continuously abuts circular continuous conical seat points 1kk whenever valve 100 is in its biased closed configuration. Please see FIGS. 5B, 5D and 9C. Atmospheric air 136 cannot enter valve body upper longitudinal tube 1a through this physical barrier of radius 4t in tight contact with conical seat points 1kk in this closed biased position. Without radius 4t the upper exterior valve seal edge 8e would be deleteriously deformed as valve seal 8 compresses against valve seat points 1kk. Radius 4t along sealing disc exterior circular edge 4g is preferably 1.392 inches in diameter.

As best seen in FIGS. 5B and 9C, valve sealing disc 4b also contains a concentrically positioned lower circular sealing disc aperture 4n for insertion of valve shaft 4a. Lower circular sealing disc aperture 4n coaxially aligns with valve shaft 4a whenever valve 100 is properly assembled, and aperture 4n is preferably 0.256 inch in diameter. Interior circular step 4ii preferably has a height of 0.01 inch less that the height (or thickness) of adjacent valve seal 8. Consequently, whenever valve seal 8 and lower sealing disc 4b are properly assembled, valve seal 8 is slightly compressed against exterior circular step 4i. This compression of approximately 0.005 inch augments valve seal 8's mechanical sealing ability.

Co-axially aligned with, and sliding over upper valve stem end 4q is valve adjustment nut 12. Please see FIGS. 5C, 9A and 9C. Nuts with a locking structure, such as valve adjustment nut 12, implement either (i) a lock washer or (ii) pinched nut with a nylon insert within the nut. For a nylon insert nut, the bolt threads cut through the nylon inserts for the locking function, or less preferably there can be locking fluid or adhesive. In the current invention, valve adjustment nut 12 is most preferably a 304 stainless steel jam nut with an 15/16-24 NF nylon insert [National Fine, which is ANSI/ASME nomenclature]. Valve adjustment nut 12 engages valve stem 4 in a threaded manner. With this engagement, rotation of valve adjustment nut 12 causes valve stem 4, with attached biasing assembly 26, to move vertically upward or downward. Biasing assembly 26 is thereafter tightened into a specific vertical position along valve stem 4 by adjustment nut 12 until contact is made with spring block opposing upper surface 5c.

More particularly, valve adjustment nut 12 preferably (i) threads onto upper threaded valve stem section 4d and (ii) thereafter abuts spring block 5 to tighten spring block 5 into a specific vertical position after torquing (i.e., rotation of nut 12 and engaged valve shaft 4a) is complete. Generally this vertical position will preferably correspond to a calibrated pre-determined valve setting preferably of 4.0 to 4.5 psi. This vertical position also corresponds to the tension(s) which first and second constant force springs 3a, 3b maintain in their deflected configurations. This tension is translated to each constant force spring 3a, 3b respectively by spring bolt 15 a, 15b. Please see FIGS. 9A and 9C.

Still referring to FIGS. 2, 5B, 5C, 9A and 9C, valve seal 8 is preferably a single circular doughnut configured elastomeric (i) cut flat gasket or (ii) formed flat gasket. Valve seal 8 also preferably has (i) one-eighth inch in thickness along its perpendicular valve seal wall 8d (i) an exterior diameter of 1.628 inches and (iii) an interior diameter of 0.75 inch. Valve seal 8 also preferably has a valve seal upper surface 8a and a valve seal lower surface 8b. Circular valve seal 8 preferably continuously contacts valve sealing disk lower stepped surface 4s immediately below valve stem radius 4t. Valve seal 8 is preferably co-axially aligned with, and positioned between, (i) seal retainer upper surface 7a, infra and (ii) lower sealing disc 4b.

Valve seal 8 preferably comprises a concentrically positioned circular valve seal aperture 8c. Valve machined shaft segment 4e preferably passes (i) through circular valve seal aperture 8c (ii) in co-axial alignment with valve lower sealing disk 4b and (iii) perpendicular to lowermost valve body flange upper surface 1o. As best seen in FIG. 9C, valve seal 8 mechanically contributes to prevent leakage of commodity between valve body conical seat 1k and valve stem lower disc 4b. In particular, the flat gasket design of valve seal 8 prevents primary leakage between radius 4t and continuous circular valve conical seat points 1kk. Valve seal 8 also minimizes any leakage between seal retainer 7 and valve stem lower disc 4b.

As best seen in FIGS. 2, 5B and 5C, preferably a single circular seal retainer 7 is positioned between, adjacent to, and co-axially aligned with (i) circular valve seal lower surface 8b and (ii) threaded seal retainer nut 13. Threaded seal retaining nut 13 preferably mechanically attaches to threaded lower valve stem end 4e in a threaded engaged manner. Threaded seal retaining nut 13 provides a mechanical stop and abutment for vertically and co-axially aligned valve stem 4, circular valve seal 8 and circular seal retainer 7. Circular seal retainer 7 is preferably a (i) a circular plate (ii) 1.634 inches in diameter and (iii) one-eighth inch in thickness. Seal retainer 7 contains a concentrically positioned seal retainer circular aperture 7c, and aperture 7c is preferably 0.256 inches in diameter. Circular seal retainer 7 is preferably (i) made of 316 stainless steel (ii) with a circular seal retainer upper surface 7a and a circular seal retainer lower surface 7b.

Referring to FIGS. 2, 5B, 5C, 9A and 9C, circular seal retainer 7 is preferably positioned adjacent to, co-axially aligned with, and below valve seal 8. Circular seal retainer 7 continuously compresses valve seal 8 against valve sealing disc lower surface 4s whenever circular retainer 7 is compressed by lock nut 13. Lock nut 13 preferably (i) co-axially aligns with valve stem 4 and (ii) contacts circular seal retainer lower surface 7b. Seal retainer nut 13 is preferably a 316 stainless steel jam nut with a ¼-20 NC nylon insert. Seal retainer nut 13 threads onto valve stem lowermost threaded end 4r through seal retainer circular aperture 7c to secure seal retainer 7 and valve seal 8 against valve stem lower disc lower surface 4s.

Modified Baffle 16 and Baffle Retainer Ring 17

Referring to FIGS. 2, 3B, 4B, 8A, 8B, 8C, 9A and 9C, modified valve baffle 16 is preferably made from a single plate in a vertically stepped configuration. Modified baffle 16 preferably has (i) a maximum height of 0.930 inch and (ii) wall thickness 16h of 0.0329 inch. Modified valve baffle 16 preferably has (i) a single flat lower anterior protruding semi-circular step 16a that is parallel to flat valve body lower flange upper surface 1*o* (ii) a single vertical rectangular step 16*b* that is perpendicular to the flat surface of step 16*a* and (iii) an uppermost posterior protruding semi-circular step 16*c* that is parallel to the flat surface of step 16*a*. Lower anterior protruding semi-circular step 16*a* preferably has a radius of 1.087 inches, while uppermost posterior protruding semi-circular step 16*b* preferably has a radius of 0.979 inches. Vertical rectangular step 16*b* is preferably 0.930 inches in height and 0.091 inch in width. Rectangular flaps 16*d*, 16*e* are each preferably (i) 1.835 inches in longitudinal length and (ii) 0.432 inch in width.

Modified valve baffle 16 also preferably comprises an upper modified protruding rectangular baffle flap 16*d* and a lower modified rectangular baffle flap 16*e*. Baffle flap 16*d* attaches to the straight edge of upper posterior protruding semicircular step 16*c*, while baffle flap 16*e* attaches to the straight edge of lower anterior protruding semicircular baffle step 16*a*. Upper rectangular baffle flap 16*d* protrudes anterior to vertical rectangular baffle step 16*b*, while lower rectangular baffle flap 16*e* protrudes posterior from vertical rectangular baffle step 16*b*. Preferably rectangular baffle flaps 16*d*, 16*e* form a single baffle rectangular window 16*f* within vertically oriented perpendicular rectangular step 16*b*. Commodity may flow through baffle rectangular window 16*f* into valve body interior cavity 1*x* from a properly connected tank opening 51*a* in a properly assembled valve 100.

Baffle rectangular window 16*f* is preferably (i) 1.835 inches in length and (ii) 0.536 inches in height. Modified baffle 16 also preferably comprises (i) a modified baffle exterior perimeter 16*g* of 6.39 inches (ii) a baffle wall thickness 16*h* of 0.0329 inch and (iii) angles 16*i* and 16*ii* with each angle 16*i*, 16*ii* being 45 degrees. More particularly, angles 16*i* and 16*ii* are formed by the junction of perpendicular rectangular step 16*b* and rectangular flap 16*d* or 16*e* as the case may be. Modified rectangular baffle flaps 16*d*, 16*e* prevent commodity from splashing upon components within valve body cavity 1*x*.

As best seen in FIGS. 9A, 9C, baffle retainer 17 (i) attaches modified baffle 16 to lowermost valve body interior surface 1*q*, and (ii) is preferably a metal retaining ring. However, baffle retainer 17 may also comprise other shapes or comprise another component which serves the same attachment purpose. Baffle retainer 17 preferably (i) is circular (ii) made of 316 stainless steel and (iii) has an exterior diameter of 2.162 inches. Baffle retainer 17 is also preferably (i) 0.031 inch in thickness with (ii) a radial wall of 0.156 inch. Baffle retainer 17 is preferably positioned (i) immediately above valve body lowermost interior surface 1*q* (ii) within valve body retaining ring groove 67.

Modified baffle 16 lodges (i) within baffle retainer 17 within groove 67 and (ii) interior surface circular continuous retaining machined wall edge 66. Valve seal 8 and sealing disc 4*b* preferably are distanced from modified baffle uppermost edge 16*s* by 3.5 inches whenever valve 100 is in a biased closed configuration. The preferred distance between (i) interior surface circular continuous retaining machined wall edge 66 and (ii) valve body retaining ring groove 67 is 0.989 inches. This distance allows modified baffle 16 to be positioned between bottom retaining rings 17 and baffle retaining machined edge 66 with an allowance of 0.029 inch for installation.

Modified baffle 16 is an improvement over existing conventional valve baffles because it reduces the area through which commodity enters valve body interior cavity 1*x*. In particular, instead of baffle protruding steps 16*a*, 16*c* each comprising a semicircle of area equal to each other, modified baffle 16 (i) has an increased area of baffle protruding step 16*a* by 20% with (ii) a reduced area of baffle protruding step 16*b* by 20%. This physical restriction of commodity flow through modified baffle window 16*f* thereby reduces physical access for commodity to splash upon valve seal 8, sealing disc 4*b* and valve conical seat 1*k*. Furthermore, previous conventional baffles require two retaining rings 17 to secure a baffle to a valve body cavity interior wall surface 1*v*. In contrast, the current continuous circular machined protruding edge 66 retains modified baffle upper edge 16*s* to valve body cavity interior wall surface 1*v*. Please see FIGS. 9A, 9C and 10. This circular machined protruding edge 66 thereby eliminates the requirement of a second retaining ring.

Valve Cover 9

Referring to FIGS. 2, 3A, 3C, 3D, 9A and 9C, valve cover 9 provides protection for first and second constant force springs 3*a*, 3*b* respectively from weather. Valve cover 9 preferably (i) comprises a rectangular 304 stainless steel plate that is (ii) 3.5 inches in width (iii) 1.5 inches in depth and (iv) 0.06 inch in thickness. Valve cover 9 has an upper valve cover surface 9*a* and a lower valve cover surface 9*b*. Welded to valve cover bottom surface 9*a* is (i) a single longitudinal rigid schedule 40 cylindrical pipe segment 9*c*, and (ii) wherein "schedule 40" is a ubiquitous industry term that refers to pipe wall thickness; the higher the schedule number, the thicker the pipe wall. Schedule 40 cylindrical pipe segment 9*c* receives inserted uppermost valve stem end 4*q* in perpendicular co-axial alignment to spring housing inset plate aperture 2*m*.

Cylindrical pipe segment 9*c* preferably is (i) 0.83 inch in longitudinal length (ii) 0.269 inch in interior diameter and (iii) 0.405 inch in exterior diameter. As seen in FIGS. 9A and 9C, rigid schedule 40 pipe segment 9*c* maintains rigid valve stem 4 in (i) co-axial, vertical and perpendicular alignment to rigid spring block 5 (ii) within spring block aperture 5*m*. Referring to FIG. 3A, valve cover 9 also contains four equidistantly positioned circular cover bolt apertures 9*d*, 9*e*, 9*f*, 9*g* [collectively circular cover bolt apertures 9*h*], and each circular cover bolt aperture 9*h* is preferably 0.13 inch in diameter. Each circular cover bolt aperture 9*h* is preferably positioned within a corresponding valve cover corner 9*dd*, 9*ee*, 9*ff* and 9*gg* [collectively valve cover corners 9*hh*].

Cover gasket 10 provides a physical seal between valve cover 9 and spring housing 2. Referring to FIGS. 2, 3C, 3D, 9A and 9C, cover gasket 10 is preferably (i) a rectangular elastomeric gasket (ii) 3.5 inches in width (ii) 1.5 inches in depth and (iii) 0.06 inch in thickness. Cover gasket 10 comprises a single cover gasket circular aperture 10*c*, 10*d*, 10*e* and 10*f* respectively [collectively cover gasket circular apertures 10*g*] in each corresponding cover gasket corner 10*cc*, 10*dd*, 10*ee* and 10*ff* [collectively cover gasket corners 10*gg*]. Preferably four cover bolts 14*a*, 14*b*, 14*c* and 14*d* [collectively cover bolts 14*e*] each preferably comprise a single 304 stainless steel #5-40 by ¾ large socket head cap screw. When valve 100 is properly assembled, a single corresponding cover bolt 14*e* inserts into each corresponding congruently aligned (i) cover bolt apertures 9*h* (ii), cover gasket apertures 10*gg*, and (iii) spring housing apertures 2*i*, 2*n*, 2*l* and 2*k* to attach valve cover 9 and cover gasket 10 to spring housing uppermost edge 2*j*.

Operation of Vacuum Relief Valve 100

1. Closed Biased Position of Vacuum Relief Valve 100

Referring to FIGS. 9C and 14, in a properly assembled valve 100, valve body longitudinal tube bore 1*p* within rectangular groove 1*m* is preferably located (i) between first and second spring housing lowermost curved protruding legs 2p, 2q respectively and (ii) within spring housing lowermost edges 2t, 2tt respectively. Atmospheric air 136 enters from underneath each spring housing curved protruding leg 2p, 2q and flows through rectangular groove 1m to enter valve body longitudinal tube bore 1p.

Atmospheric air 136 may always flow along uppermost longitudinal tube end rectangular groove 1m and into longitudinal tube bore 1p in either the open or biased valve configuration. However, in the biased closed position valve stem lower sealing disc 4b and circular valve seal 8 continuously abut continuous circular valve body interior conical valve seat points 1kk along valve body interior wall surface 1v. Together with radius 4t and valve seal 8, conical valve seat points 1kk create a continuous circular joint that prevents environmental air 136 from entering valve body cavity 1x through valve body longitudinal uppermost tube bore 1p.

To maintain this closed biased position, each constant force spring 3a, 3b of the preferably single biasing assembly 26 is biased, i.e., stretched and deflected by the movement and final predetermined vertical position of attached spring block 5. This constant force tension continuously pulls operatively attached valve lower sealing disc 4b and circular valve seal 8 upwards against continuous circular valve body interior conical seat points 1kk. Constant force springs 3a, 3b deflect as necessary to maintain valve seal 8 and lower stem lower disc 4b abutting continuous circular valve body interior conical seat points 1kk (wherein deflection is the coiling or uncoiling of the constant force springs 3a, 3b). Preferably each constant force spring 3a deflects to the identical quantitative extent and direction as constant force spring 3b.

To maintain necessary spring deflection for a closed valve configuration at a specific pre-selected pressure, threaded nut 12 at valve stem uppermost end 4q is rotated along threaded valve stem segment 4d. As a result, valve stem 4 moves vertically up or down perpendicular (without rotation) to valve body lower flange upper surface 10. As valve stem 4 and moves vertically upward or downward, spring block 5 also moves vertically because it mechanically attaches to spring block 5 at co-axially aligned spring block aperture 5h. Force from the vertically aligned and moving spring block 5 translates to constant force helical springs 3a, 3b through spring bolts 15a, 15b until a pressure of preferably 4.0 to 4.5 pounds per square inch (psi) is achieved. Threaded adjustment nut 12 thereafter is tightened against spring block opposing uppermost surface 5c and at the vertical height of valve stem 4 at which 4.0 to 4.5 psi is achieved.

2. Opening of Vacuum Relief Valve 100

Referring to FIG. 9A, a tank vacuum within tank 51 exerts a negative pressure against valve stem lower disc 4b and valve seal 8. This negative pressure directly opposes the pressure exerted by preset and pre-calibrated constant force springs 3a, 3b. When the magnitude of the negative pressure within tank 51 overcomes the opposing preset constant force spring pressure, valve stem 4 moves vertically downward towards valve body interior cavity bottommost interior surface 1q. This downward vertical movement of valve stem 4 pulls valve stem lower sealing disc 4b and valve circular seal 8 downward and away from valve body interior conical seat points 1kk.

Without sealing disk 4b and valve seal 8 mechanically forming a tight joint with interior conical continuous wall points 1kk, atmospheric air 136 from valve body upper longitudinal tube cylindrical bore 1p can now enter valve body interior cavity 1x through valve body conical seat 1k.

Atmospheric air 136 thereafter flows into lowermost valve body flange aperture 1d and (iii) through congruently aligned tank opening 51a. When valve 100 is in this open configuration spring block 5 moves vertically downward a distance no greater than the permanent position of inset plate 2a.

Figure 12B:
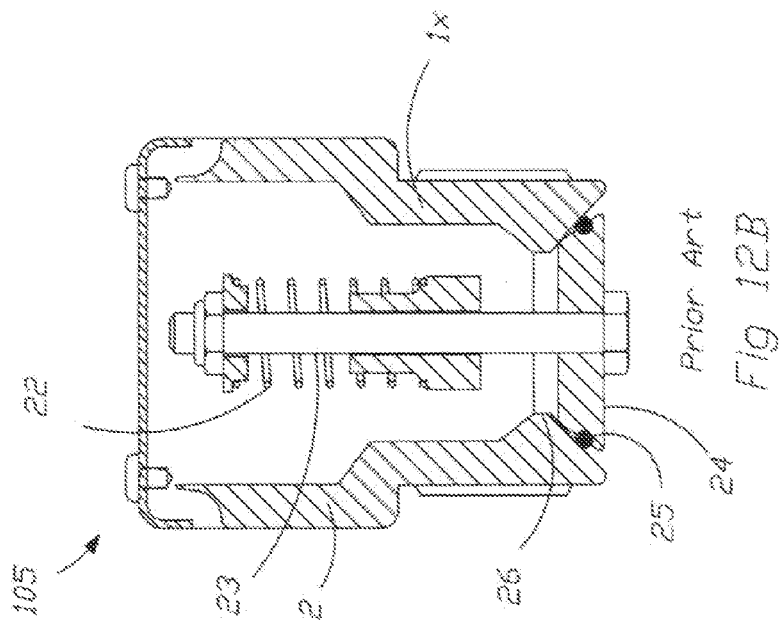
FIG. 12B is a lateral cross-sectional view of the valve of FIG. 12A.
Figure 12A:
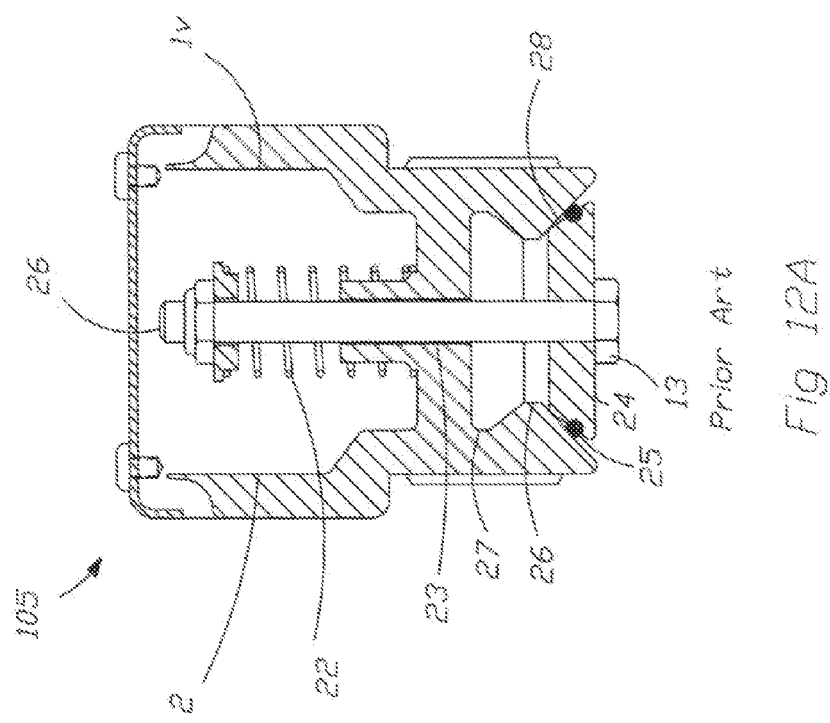
FIG. 12A is an anterior cross-sectional view of a prior art helical spring vacuum relief valve with O-ring.

The quantitative scalar magnitude of the closed position (default) spring tension that the opposing tank negative pressure must exceed is determined by the force translated from vertical repositioning of spring block 5. This modified position of spring block 5 is maintained at that vertical position within spring housing 2 by abutment and tightening of uppermost screw 12 against spring block 5. In contrast to the pending invention, FIG. 12 illustrates a conventional vacuum relief valve 105 that comprises one vertically oriented helical spring 22. An upper screw 26 attaches to the uppermost end of the valve stem 23. The valve stem lowermost disc 24 is adjacent to, and immediately below, cylindrical channel 26 and where cylindrical channel 26 is continuous with larger cylindrical flow channel 27. Both lowermost disc 24 and cylindrical structure 26 are annular and co-axially aligned with prior art stem valve 23. A single O-ring 25 is lodged within disc 24 to prevent leakage between circular continuous conical step 28 and structure 27.

Assembly of Vacuum Relief Valve 100

The preferred vacuum relief valve is preferably assembled in the following chronological order of steps:

1. Sealing disc 4b is welded to valve shaft 4a at segment 4m.

2. A single spring housing 2 is attached to valve body 1a by welding spring housing lowermost curved protruding legs interior surfaces 2u, 2v to (i) valve body upper exterior surface 1t and (ii) valve uppermost longitudinal tube edge 1c.

3. A single flexible circular valve seal 8 is inserted snugly into valve stem sealing disk stepped lower surface 4s.

4. Seal retainer 7 is co-axially aligned with lowered valve stem threaded segment 4e through seal retainer aperture 7c. Circular seal retainer 7 is thereafter secured thereon and compressed upon valve seal 8 with single seal retainer nut 13.

5. Valve stem 4, valve seal 8, seal retainer 7, seal retainer nut 13 are inserted so uppermost valve stem end 4q preferably (i) initially enters valve body cavity through lowermost valve body opening 1d and thereafter inserts through co-axially aligned (ii) spring housing central aperture 2m (iii) spring block aperture 5h and (iv) valve body upper longitudinal tube bore 1p. FIGS. 9A and 9C.

6. Each single first and second constant force spring 3a, 3b respectively is attached to a corresponding spring block #5-40 aperture 5i, 5j respectively by a single corresponding spring bolt 15a, 15b respectively.

7. Each corresponding spring drum 6a, 6b respectively is inserted within a corresponding constant force spring longitudinal cavity 3h. In turn, each corresponding drum pin 11a, 11b respectively is inserted within a corresponding spring drum longitudinal aperture 6c. FIGS. 2 and 7.

8. Each drum pin 11a, 11b is inserted into a corresponding pair of spring housing opposing vertical slots 2k.

9. Valve stem 4 is then held rigidly while adjustment nut 12 is rotated clockwise to elevate valve stem 4 by engaging threads on adjustment nut 12. Elevation of valve stem 4 continues until the total translated tension from constant force helical springs 3a, 3b is preferably 4.0 to 4.5 psi (pounds per square inch). Valve stem 4 is then tightened into position with adjustment nut 12.

Figure 13:
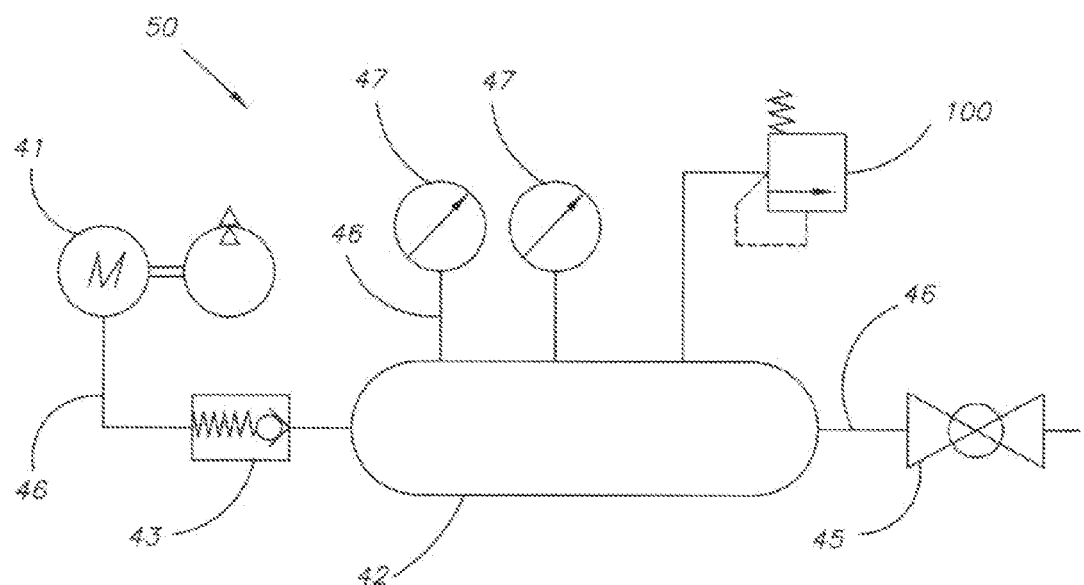
FIG. 13 is as schematic representation of the apparatus for pre-calibrating the vacuum relief valve of FIG. 2.

10. Referring to FIG. 13, to obtain the required valve stem 4 position in step 9 immediately above, the valve manufacturer the installer initially mounts vacuum relief valve 100 upon a suitable test device 50. In particular, test device 50 preferably comprises a reservoir 42 to which the assembled vacuum relief valve 100 is attached. Test device 50 also comprises a (i) vacuum pump 41 to draw a vacuum in the reservoir 42 (ii) check valve 43 by which to maintain the vacuum within test device 50 (iii) ball valve 45 to allow atmospheric air 136 into reservoir 42, and (iv) manometer 47 to measure the vacuum in inches of Hg. Components 41, 42, 43, 45, 47 are connected by piping 46 in a manner well known in this industry. By this process vacuum relief valve 100 is (i) calibrated to (ii) 4.0 to 4.5 psi when the manometer reads 9.162 inches Hg and (iii) when no further atmospheric air 136 is drawn into reservoir 42 through vacuum relief valve 100.

11. Following the pre-calibration of the vacuum relief valve 100 in step 10 above, cover gasket 10 is positioned upon spring housing uppermost edge 2*j*. Valve cover 9 is then positioned upon cover gasket 10 and spring housing upper edge 2*j*. Valve cover 9 is secured with four cover bolts 14*a*, 14*b*, 14*c*, 14*d* through congruently aligned corresponding single valve cover apertures 9*h*, gasket apertures 10*h* and spring housing uppermost apertures 5*s*. Valve cover pipe section 9*c* may be either (i) welded to or (ii) cast integrally to valve cover 9 and (iii) coaxially align with and receive valve stem end 4*q*.

12. Modified baffle 16 is next positioned within valve body interior cavity 1*x* (i) through valve body lowermost opening 1*d* and (ii) in contiguous vertical alignment with valve body interior cavity lowermost surface 1*q*. Baffle uppermost semi-circular edge 16*s* is placed within machined edge 66.

13. Baffle retainer ring 17 is inserted (i) within valve body cavity lowermost interior groove 67 wherein ring 17 (ii) continuously contacts and supports modified baffle 16 at its lowermost baffle semi-circular edge 16*t*. Baffle retainer ring 17 is inserted thought valve body lowermost opening 1*d*.

Attachment of Vacuum Relief Valve 100 to Rail Tank, Truck Tank or Other Closed Container 51

As seen in FIGS. 1 and 3B, an upper container or tank surface 53 preferably includes a tank mounting flange 57 to which a single assembled vacuum relief valve 100 attaches. Tank surface 53 preferably supports a single protective housing 56 that houses a dual preset pressure relief valve 102 as well as the assembled vacuum relief valve 100. Protective housing 56 also preferably includes a single (i) protecting housing hinge 56*a* (ii) cover handle 56*b* and (iii) safety valve vent flap 56*c*. Tank mounting flange 57 also preferably contains (i) four equidistantly spaced ½ inch mounting flange studs 58 (ii) upon a bolt circle 59 (iii) in which bolt circle 59 is preferably 3 and ⅞ inches in diameter. Preferably four mounting flange studs 58 are previously threaded into, and protrude from, tank mounting flange 57 along the circumference of bolt circle 59. Tank mounting studs 58 correspond to, and can congruently align with, stud apertures 1*i* when assembly vacuum relief valve 100 is properly positioned upon tank mounting flange 57.

The installer next places a single mounting flange gasket 48 over and between tank mounting flange studs 58, so that each stud 58 protrudes through a corresponding opening 58*a* within gasket 48. Mounting flange gasket 48 is preferably (i) 0.125 inch in thickness with an (i) exterior diameter of three and one-fourth inches, and (ii) interior diameter of two and 11/16 inch. Vacuum relief valve 100 (i) sits upon congruently aligned mounting flange gasket 48, (ii) while gasket 48 congruently sits upon bolt circle 59 and wherein (iii) bolt circle 59*a* congruently aligns with tank aperture 51*a*. Mounting flange gasket 48 is preferably made of an elastomeric material or hard rigid composite from the group consisting of (i) ethylene propylene diene monomers, compressed fiber sheet gasket materials, co-polymers of hexflourupropylene, vinylidene floride, terpolymers of tetrefluoroethylene, vinylidene fluoride, hexafluoroproyene and pefloromethylvinyl ethers.

The installer positions assembled vacuum relief valve 100 above mounting flange gasket 48 after the pre-calibration of vacuum relief valve 100 described supra is complete. The installer next lowers fully assembled vacuum relief valve 100 onto flange gasket 48 while congruently aligning valve body bolt apertures 1*i* with upper tank surface four mounting studs 58.

The installer next applies four nuts 62, each preferably one-half inch in diameter, to corresponding mounting studs 58 along bolt circle 59 and which studs 58 protrude above valve flange upper surface 1*o*. The installer thereafter tightens nuts 62 in a criss-cross bolting pattern by which each opposing nut 62 is tightened in a manner well known in this particular industry. During this procedure each nut 62 is tightened to a torque of preferably 75 to 100 foot pounds. The installer finally pressurizes tank car or container 51 and tests for leakage between lower valve flange 1*b*, gasket 48 and tank mounting flange 57 in a manner well known in this industry.

An example of the forgoing opening of a fully assembled and operation vacuum relief valve 100 of the current invention is as follows: During operation of tank or similar closed container 51, pressure may increase or decrease within tank 51. When tank pressure attains a value of negative 4.5 psi (pounds per square inch) this vacuum begins to draw valve stem 4 and co-axially aligned valve seal 8, valve retainer disc 7 and retaining screw 13 vertically downward into valve body interior cavity 1*x*. Simultaneously constant force springs 3*a*, 3*b* proceed to deflect with ends 3*i* moving vertically downward while spring 3*b* rotates clockwise and spring 3*a* rotates counterclockwise. This sequence of events presumes that the vacuum relief valve 100 has been pre-calibrated at 4.5 psi.

These events result in atmospheric air 136 passing between valve seat 1*k* and radius 4*t* into valve body interior cavity 1*x*. This air flow continues until the vacuum within tank 51 has diminished to a value of, for example, negative 4 psi. At negative 4 psi and values greater than negative 4 psi, valve stem 4 moves vertically upward to its biased position. This renewed tight contact of valve conical circular seat points 1*kk* by radius 4*t* and circular valve seal 8 recreates a leak tight condition between (i) valve stem lower disc 4*b* and (ii) valve body cavity interior wall 1*v*.

The foregoing features are illustrative of the present invention and are not to be construed as limitations of the invention. Although the preferred embodiment of the invention is disclosed, those skilled in this art understand that modifications are possible without significantly departing from the novel teachings and advantages of the present invention. The present invention is defined by the following claims, and with equivalents of the claims to be included therein.

The invention claimed is:
1. A valve for eliminating a vacuum within an operatively connected tank or other operatively connected container, said valve comprising a constant force biasing assembly, a sealing disk, an interior body surface, an integral valve stem, a lower valve body flange circular opening and a valve body exterior wall surface, said constant force biasing assembly being biased at an initial preset pressure magnitude against a vacuum arising from commodity within said operatively connected tank or container, said constant force biasing assembly maintaining said valve in an open configuration after a magnitude of said vacuum arising from commodity decreases, and said constant force biasing assembly maintaining said valve in an open configuration whenever said initial preset pressure magnitude is less than said magnitude of said vacuum arising from commodity, said open configuration of said valve allowing air to enter said valve and thereafter flow through said lower valve body flange circular opening into said operatively connected tank or other said container, said constant force biasing assembly comprising a single solid polyhedron and at least two constant force biasing components, said integral valve stem comprising sections, said integral valve stem being threaded at a section that inserts within said solid polyhedron, said valve further comprising a seal, said interior body surface comprising a single conical seat, said conical seat forming a physical barrier in combination with said sealing disk and said seal whenever said valve is in a valve closed configuration, said valve comprising a single air intake opening wherein atmosphere air enters said valve during a valve open configuration or a valve closed configuration, said single air intake opening not containing or comprising said at least two constant force biasing components, said valve being located exterior to said operatively attached tank or said container, said single air opening being bounded by a single spring housing and a single valve upper body longitudinal tube, said spring housing comprising a first opposing curved protrusion lowermost leg and a second opposing curved protrusion lowermost leg, said single air intake channel bounded by said opposing curved protrusion lowermost legs.

2. A valve for eliminating a vacuum within an operatively connected tank or other operatively connected container, said valve comprising a constant force biasing assembly, a sealing disk, an interior body surface, an integral valve stem, a lower valve body flange circular opening and a valve body exterior wall surface, said constant force biasing assembly being biased at an initial preset pressure magnitude against a vacuum arising from commodity within said operatively connected tank or container, said constant force biasing assembly maintaining said valve in an open configuration after a magnitude of said vacuum arising from commodity decreases, and said constant force biasing assembly maintaining said valve in an open configuration whenever said initial preset pressure magnitude is less than said magnitude of said vacuum arising from commodity, said open configuration of said valve allowing air to enter said valve and thereafter flow through said lower valve body flange circular opening into said operatively connected tank or other said closed container, said constant force biasing assembly comprising a single solid polyhedron and at least two constant force biasing components, said integral valve stem comprising sections, said integral valve stem being threaded at a section that inserts within said solid polyhedron, said valve further comprising a seal, said body tube interior surface comprising a single conical seat, said conical seat forming a physical barrier in combination with said sealing disk and said seal whenever said valve is in a valve closed configuration, said valve comprising a single air intake opening wherein atmosphere air enters said valve during a valve open configuration or a valve closed configuration, said single air intake opening not containing or comprising said at least two constant force biasing components, said valve being located exterior to said operatively attached tank or said container, said valve further comprising a baffle, said interior body surface further comprising a machined edge and a lower body flange circular opening, said machined edge retaining said baffle along said interior body surface, said baffle restricting the flow of commodity through said lower body flange circular opening into said interior continuous valve body cavity, said baffle comprising pre-selected surface areas by which to restrict commodity from entering said valve body cavity from said lower body flange circular opening.

3. A valve for eliminating a vacuum within an operatively connected tank or other operatively connected container, said valve comprising a constant force biasing assembly, a sealing disk, an interior body surface, an integral valve stem, a lower valve body flange circular opening and a valve body exterior wall surface, said constant force biasing assembly being biased at an initial preset pressure magnitude against a vacuum arising from commodity within said operatively connected tank or container, said constant force biasing assembly maintaining said valve in an open configuration after a magnitude of said vacuum arises arising from commodity decreases, and said constant force biasing assembly maintaining said valve in an open configuration whenever said initial preset pressure magnitude is less than said magnitude of said vacuum arising from commodity, said open configuration of said valve allowing air to enter said valve and thereafter flow through said lower valve body flange circular opening into said operatively connected tank or other said container, said constant force biasing assembly comprising a single solid polyhedron and at least two constant force biasing components, said integral valve stem comprising sections, said integral valve stem being threaded at a section that inserts within said solid polyhedron, said valve further comprising a seal, said interior body surface comprising a single conical seat, said conical seat forming a physical barrier in combination with said sealing disk and said seal whenever said valve is in a valve closed configuration, said valve comprising a single air intake opening wherein atmosphere air enters said valve during a valve open configuration or a valve closed configuration, said single air intake opening not containing or comprising said at least two constant force biasing components,
said valve being located exterior to said operatively attached tank or said container,
said valve further comprising a baffle and a lower body flange circular opening,
said baffle comprising a single flat lower anterior protruding semi-circular step and a single flat uppermost protruding semi-circular step,
said single flat lower anterior protruding semi-circular step comprising approximately twenty percent greater area than said single flat uppermost posterior protruding semi-circular step.

4. A valve for eliminating a vacuum within an operatively connected tank or other operatively connected container,
said valve comprising a constant force biasing assembly, a sealing disk, an interior body surface, an integral valve stem, a lower valve body flange circular opening and a valve body exterior wall surface,
said constant force biasing assembly being biased at an initial preset pressure magnitude against a vacuum arising from commodity within said operatively connected tank or container,
said constant force biasing assembly maintaining said valve in an open configuration after a magnitude of said vacuum arising from commodity decreases, and
said constant force biasing assembly maintaining said valve in an open configuration whenever said initial preset pressure magnitude is less than said magnitude of said vacuum arising from commodity,
said open configuration of said valve allowing air to enter said valve and thereafter flow through said lower valve body flange circular opening into said operatively connected tank or other said container,
said constant force biasing assembly comprising a single solid polyhedron and at least two constant force biasing components,
said integral valve stem comprising sections, said integral valve stem being threaded at a section that inserts within said solid polyhedron,
said valve further comprising a seal,
said interior body surface comprising a single conical seat, said conical seat forming a physical barrier in combination with said sealing disk and said seal whenever said valve is in a valve closed configuration,
said valve comprising a single air intake opening wherein atmosphere air enters said valve during a valve open configuration or a valve closed configuration,
said single air intake opening not containing or comprising said at least two constant force biasing components,
said valve being located exterior to said operatively attached tank or said container,
said valve comprising a spring housing, said spring housing comprising a lower inset plate and a plurality of slots,
said spring housing attaching to said valve body upper exterior surface, and
each of said at least two constant force biasing components attaching to a corresponding device within each said slot.

5. A valve for eliminating a vacuum within an operatively connected tank or other operatively connected container,
said valve comprising a constant force biasing assembly, a sealing disk, an interior body surface, an integral valve stem, a lower valve body flange circular opening and a valve body exterior wall surface,
said constant force biasing assembly being biased at an initial preset pressure magnitude against a vacuum arising from commodity within said operatively connected tank or container,
said constant force biasing assembly maintaining said valve in an open configuration after a magnitude of said vacuum arising from commodity decreases, and
said constant force biasing assembly maintaining said valve in an open configuration whenever said initial preset pressure magnitude is less than said magnitude of said vacuum arising from commodity,
said open configuration of said valve allowing air to enter said valve and thereafter flow through said lower valve body flange circular opening into said operatively connected tank or other said container,
said constant force biasing assembly comprising a single solid polyhedron and at least two constant force biasing components,
said integral valve stem comprising sections, said integral valve stem being threaded at a section that inserts within said solid polyhedron,
said valve further comprising a seal,
said interior body surface comprising a single conical seat,
said conical seat forming a physical barrier in combination with said sealing disk and said seal whenever said valve is in a valve closed configuration,
said valve comprising a single air intake opening wherein atmosphere air enters said valve during a valve open configuration or a valve closed configuration,
said single air intake opening not containing or comprising said at least two constant force biasing components,
said valve being located exterior to said operatively attached tank or said container,
said single air intake opening comprises a single valve upper longitudinal body tube,
said single valve upper longitudinal body tube comprising a single valve upper body longitudinal tube bore,
said single valve upper body longitudinal tube comprising an opening, said opening being contiguous with said bore,
said single upper valve body longitudinal tube further comprising a single valve body tube rectangular groove,
said single valve body rectangular groove containing said opening of said single valve upper body longitudinal tube bore.

* * * * *